(12) United States Patent
Orr et al.

(10) Patent No.: US 9,077,254 B2
(45) Date of Patent: Jul. 7, 2015

(54) SWITCHING MODE POWER SUPPLY USING PULSE MODE ACTIVE CLAMPING

(71) Applicant: SOLANTRO SEMICONDUCTOR CORP., Ottawa (CA)

(72) Inventors: Raymond Kenneth Orr, Kanata (CA); Gabriel Scarlatescu, Bucharest (RO); Tudor Lipan, Ottawa (CA)

(73) Assignee: Solantro Semiconductor Corp., Ottawa (CA)

( * ) Notice: Subject to any disclaimer, the term of this patent is extended or adjusted under 35 U.S.C. 154(b) by 139 days.

(21) Appl. No.: 13/940,774

(22) Filed: Jul. 12, 2013

(65) Prior Publication Data

US 2015/0016153 A1 Jan. 15, 2015

(51) Int. Cl.
*H02M 3/335* (2006.01)

(52) U.S. Cl.
CPC .................. *H02M 3/33538* (2013.01)

(58) Field of Classification Search
CPC ............. H02M 2001/0058; H02M 2001/0032
USPC .......................... 363/16, 17, 20, 21.01–21.18
See application file for complete search history.

(56) References Cited

U.S. PATENT DOCUMENTS

| | | | | |
|---|---|---|---|---|
| 5,126,931 A * | 6/1992 | Jitaru | ............... | 363/21.04 |
| 5,146,394 A * | 9/1992 | Ishii et al. | ............... | 363/16 |
| 5,430,633 A * | 7/1995 | Smith | ............... | 363/20 |
| 5,448,467 A * | 9/1995 | Ferreira | ............... | 363/17 |
| 5,508,903 A * | 4/1996 | Alexndrov | ............... | 363/16 |
| 5,570,278 A * | 10/1996 | Cross | ............... | 363/20 |
| 5,734,563 A * | 3/1998 | Shinada | ............... | 363/21.06 |
| 5,796,595 A * | 8/1998 | Cross | ............... | 363/71 |
| 6,011,703 A * | 1/2000 | Boylan et al. | ............... | 363/21.06 |
| 6,061,252 A * | 5/2000 | Hosotani | ............... | 363/16 |
| 6,069,803 A * | 5/2000 | Cross | ............... | 363/21.14 |
| 6,314,002 B1 * | 11/2001 | Qian et al. | ............... | 363/21.04 |
| 6,320,763 B2 * | 11/2001 | Hosotani | ............... | 363/16 |
| 6,469,913 B2 * | 10/2002 | Hosotani et al. | ............... | 363/16 |
| 6,552,917 B1 * | 4/2003 | Bourdillon | ............... | 363/21.12 |
| 6,639,811 B2 * | 10/2003 | Hosotani et al. | ............... | 363/19 |
| 6,934,167 B2 * | 8/2005 | Jang et al. | ............... | 363/21.02 |
| 6,947,297 B2 * | 9/2005 | Ke et al. | ............... | 363/20 |
| 7,606,051 B2 * | 10/2009 | Wittenbreder, Jr. | ............... | 363/39 |
| 7,706,156 B2 * | 4/2010 | Hsieh et al. | ............... | 363/21.02 |
| 7,869,235 B2 * | 1/2011 | Lin et al. | ............... | 363/56.11 |
| 7,916,505 B2 * | 3/2011 | Fornage | ............... | 363/21.01 |
| 8,391,027 B2 | 3/2013 | Lidak et al. | | |
| 2004/0223344 A1 * | 11/2004 | Jacobs | ............... | 363/20 |
| 2005/0174811 A1 * | 8/2005 | Liu et al. | ............... | 363/21.01 |
| 2006/0209571 A1 * | 9/2006 | Aso et al. | ............... | 363/21.01 |
| 2007/0242487 A1 * | 10/2007 | Orr | ............... | 363/21.12 |
| 2008/0315858 A1 * | 12/2008 | Hong et al. | ............... | 323/351 |
| 2009/0097279 A1 * | 4/2009 | Zhang et al. | ............... | 363/17 |
| 2009/0179491 A1 * | 7/2009 | Ferguson et al. | ............... | 307/31 |
| 2009/0257254 A1 * | 10/2009 | Leu | ............... | 363/40 |
| 2009/0257255 A1 * | 10/2009 | Zhang | ............... | 363/50 |
| 2010/0067259 A1 * | 3/2010 | Liu | ............... | 363/21.01 |
| 2010/0246215 A1 * | 9/2010 | Mase et al. | ............... | 363/21.04 |
| 2010/0277955 A1 * | 11/2010 | Duan et al. | ............... | 363/21.02 |
| 2011/0032731 A1 * | 2/2011 | Coleman et al. | ............... | 363/21.12 |
| 2013/0063982 A1 * | 3/2013 | Ye et al. | ............... | 363/17 |
| 2014/0098572 A1 * | 4/2014 | Scarlatescu et al. | ............... | 363/16 |
| 2014/0160798 A1 * | 6/2014 | Chung et al. | ............... | 363/15 |
| 2014/0226367 A1 * | 8/2014 | Hu et al. | ............... | 363/21.04 |

* cited by examiner

*Primary Examiner* — Timothy J Dole
*Assistant Examiner* — Yusef Ahmed
(74) *Attorney, Agent, or Firm* — Barnes & Thornburg LLP

(57) ABSTRACT

An active clamp circuit includes a clamp capacitance and a clamp switch coupled in a circuit path, and a diode coupled across the clamp switch.

21 Claims, 21 Drawing Sheets

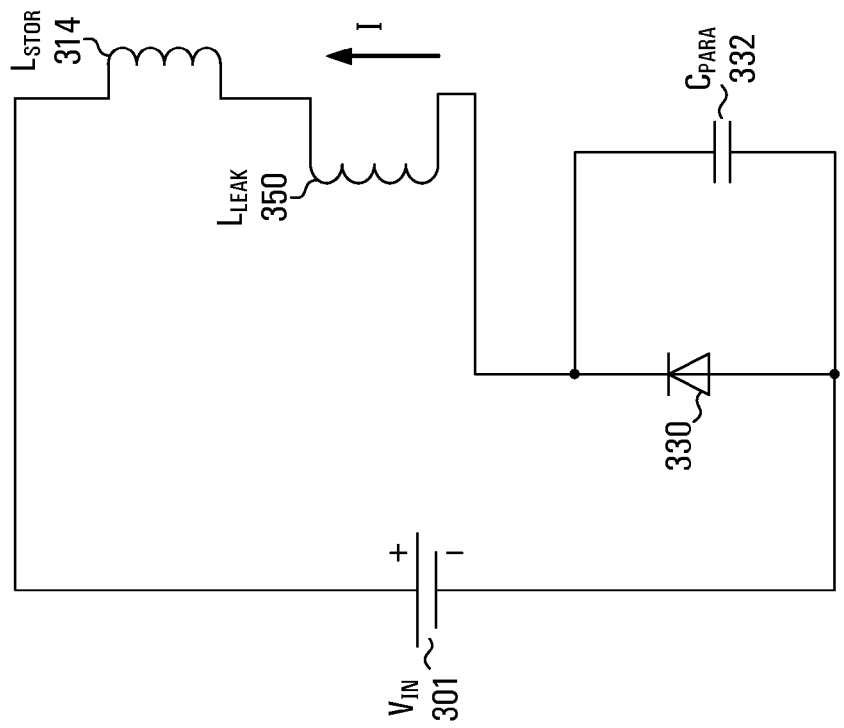
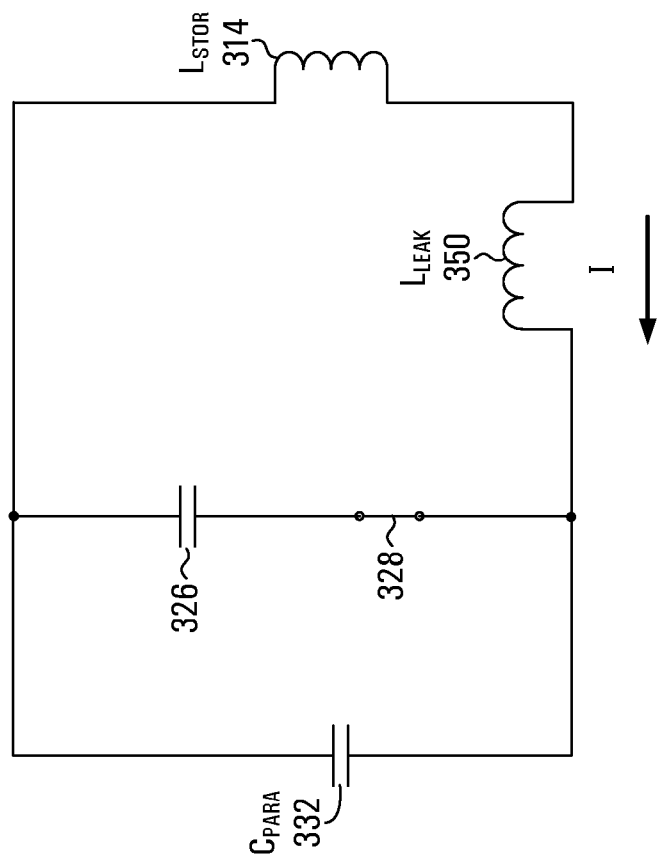
FIG. 3D
FIG. 3C

US 9,077,254 B2

SWITCHING MODE POWER SUPPLY USING PULSE MODE ACTIVE CLAMPING

FIELD OF THE INVENTION

This invention relates generally to switching power converters and more particularly to pulse width modulated Direct Current (DC) power converters. DC converters are alternatively referred to as DC to DC converters, DC or DC to DC regulators, switch mode regulators or power supplies. The term "DC converter" or "converter" is used herein to include all such terms.

BACKGROUND

DC power converters convert power at one DC voltage to power at another DC voltage. An important application of DC converters is in the field of photovoltaics in which an unregulated DC voltage produced by a solar panel is converted into regulated DC power. A popular DC converter architecture is the flyback converter. The flyback architecture uses a switched transformer coupled between the converter's input and output circuits. A primary switch, in series with the primary winding of the transformer, controls the connection of the primary winding to an input voltage source. In a flyback converter, energy is taken from the input power source and stored in the magnetisation inductance of the transformer during a first portion of the flyback cycle, and is then transferred to the converter output during the second portion of the flyback cycle. A "clamp" circuit is frequently coupled across the primary winding of the transformer. The clamp circuit is designed to limit the voltage stress on the primary switch when it opens. A clamp circuit provides a temporary current path for primary current and limits the voltages across the primary switch. Clamp circuits can be implemented in a variety of ways.

SUMMARY

According to an aspect of the present disclosure, an apparatus includes an active clamp circuit, a power converter, and a controller. The active clamp circuit includes a clamp capacitance, a diode, and a clamp switch, with the clamp capacitance and the clamp switch being coupled in a circuit path, and the diode being coupled across the clamp switch. The power converter is coupled to the active clamp circuit, and includes a storage inductance coupled in a circuit path with a converter switch. The controller is operatively coupled to the clamp switch and the converter switch, to close the clamp switch during a non-conduction phase of the converter switch in a converter switching cycle to cause the clamp capacitance to be discharged into the storage inductance exclusively through the clamp switch, and to subsequently open the clamp switch during the non-conduction phase of the converter switch to cause the clamp capacitance to be charged from the storage inductance exclusively through the diode during a non-conduction phase of the converter switch in a next converter switching cycle.

The controller could be configured to open the clamp switch during the discharge of the clamp capacitance to reduce the voltage across the converter switch.

In an embodiment, the circuit path of the power converter is coupled across terminals of an input power source, with the circuit path of the active clamp circuit being coupled between (i) a node in the circuit path of the power converter between the storage inductance and the converter switch and (ii) one of the terminals of the input power source.

In an example implementation, the clamp switch is a PMOS power Metal Oxide Semiconductor Field Effect Transistor (MOSFET), the diode is an intrinsic diode formed between a source and a body of the PMOS power MOSFET, the circuit path of the active clamp circuit is coupled to the node, the active clamp circuit further includes a second capacitance coupling the circuit path of the active clamp circuit to the one of the terminals of the input power source, and the controller includes a voltage supply to supply a node between the second capacitance and the circuit path of the active clamp circuit.

The controller could be configured to determine timing of a voltage maximum at the node, and to close the clamp switch at the voltage maximum.

The controller is configured, in an embodiment, to close the clamp switch for a clamp switch ON time during the non-conduction phase of the converter switch in the converter switching cycle, to open the clamp switch at an end of the clamp switch ON time, to analyze a waveform of the voltage at the node until the converter switch is closed in the next converter switching cycle, and to control a value of the clamp switch ON time for the next converter switching cycle based on the analysis. The controller could be configured to analyze the waveform of the voltage at the node to determine a value of the node voltage minimum, and to control the value of the clamp switch ON time based on a voltage difference between the determined value of the voltage minimum and a target minimum. The controller could also or instead be configured to analyze the waveform of the voltage at the node to determine energy stored in the storage inductance, and to control the value of the clamp switch ON time based on an energy difference between the stored energy and a target energy.

According to another embodiment, the controller is configured to close the clamp switch for a clamp switch ON time during the non-conduction phase of the converter switch in the converter switching cycle, to open the clamp switch at an end of the clamp switch ON time, to determine a time interval between the opening of the clamp switch and a time at which voltage at the node reaches a preset voltage, and to control a value of the clamp switch ON time for the next converter switching cycle based on a time difference between the determined time interval and a time interval value which corresponds to a voltage minimum of zero at the node.

The controller could be configured to close the clamp switch at a delay time after the converter switch is opened in the converter switching cycle, to open the clamp switch at an end of the clamp switch ON time during which the clamp switch is closed, to analyze a waveform of the voltage at the node until the converter switch is closed in the next converter switching cycle, and to control a value of the delay time for the next converter switching cycle based on the analysis. In this case, the controller could be configured to analyze the waveform of the voltage at the node to determine a value of a node voltage minimum, and to control the value of the delay time based on a voltage difference between the determined value of the node voltage minimum and a target value.

A method involves: controlling a converter switch of a power converter to provide a conduction phase and a non-conduction phase during converter switching cycles, and controlling a clamp switch of an active clamp circuit. The power converter includes a storage inductance coupled in a circuit path with the converter switch, and the active clamp circuit includes a clamp capacitance, a diode, and the clamp switch, with the clamp capacitance and the clamp switch being coupled in a circuit path, and the diode being coupled across the clamp switch. Controlling of the clamp switch involves closing the clamp switch during the non-conduction phase of the converter switch in a converter switching cycle to cause the clamp capacitance to be discharged into the storage inductance exclusively through the clamp switch, and subsequently opening the clamp switch during the non-conduction phase of the converter switch to cause the clamp capacitance to be charged from the storage inductance exclusively through the diode during the non-conduction phase of the converter switch in a next converter switching cycle.

The method could also involve opening the clamp switch during the discharge of the clamp capacitance to reduce voltage across the converter switch.

The circuit path of the power converter could be coupled across terminals of an input power source, with the circuit path of the active clamp circuit being coupled between (i) a node in the circuit path of the power converter between the storage inductance and the converter switch and (ii) one of the terminals of the input power source.

The method could then also involve: determining timing of a voltage maximum at the node, and closing the clamp switch comprising closing the clamp switch at the voltage maximum.

In an embodiment, closing the clamp switch involves closing the clamp switch for a clamp switch ON time during the non-conduction phase of the converter switch in the converter switching cycle, opening the clamp switch involves opening the clamp switch at an end of the clamp switch ON time, and the method also includes: analyzing a waveform of the voltage at the node until the converter switch is closed in the next converter switching cycle; and controlling a value of the clamp switch ON time for the next converter switching cycle based on the analysis.

The analyzing could involve determining a value of the node voltage minimum, in which case controlling a value of the clamp switch ON time could involve controlling the value of the clamp switch ON time based on a voltage difference between the determined value of the voltage minimum and a target minimum.

The analyzing could also or instead involve determining energy stored in the storage inductance, in which case controlling a value of the clamp switch ON time could involve controlling the value of the clamp switch ON time based on an energy difference between the stored energy and a target energy.

According to another embodiment, closing the clamp switch involves closing the clamp switch for a clamp switch ON time during the non-conduction phase of the converter switch in the converter switching cycle, opening the clamp switch involves opening the clamp switch at an end of the clamp switch ON time, and the method also includes: determining a time interval between the opening of the clamp switch and a time at which voltage at the node reaches a preset voltage; and controlling a value of the clamp switch ON time for the next converter switching cycle based on a time difference between the determined time interval and a time interval value which corresponds to a voltage minimum of zero at the node.

Closing and opening the clamp switch could involve closing the clamp switch at a delay time after the converter switch is opened in the converter switching cycle, and opening the clamp switch comprising opening the clamp switch at and end of a clamp switch ON time during which the clamp switch is closed. The method could further include: analyzing a waveform of the voltage at the node until the converter switch is closed in the next converter switching cycle; and controlling a value of the delay time for the next converter switching cycle based on the analysis.

The analyzing could involve determining a value of the node voltage minimum, and controlling a value of the delay time could then involve controlling the value of the delay time based on a voltage difference between the determined value of the node voltage minimum and a target value.

Such a method could be implemented, for example, in the form of a non-transitory machine-readable medium storing instructions which, when executed, perform the method.

Other aspects and features of embodiments of the present disclosure will become apparent to those ordinarily skilled in the art upon review of the following description.

BRIEF DESCRIPTION OF THE DRAWINGS

FIG. 3C is a schematic drawing of an equivalent circuit of the converter of FIG. 3A with the clamp switch closed and the primary switch open.

FIG. 3D is schematic drawing of an equivalent circuit of the converter of FIG. 3A when the clamp switch is opened but before the primary switch is closed.

DETAILED DESCRIPTION

Flyback Converter

Figure 1:
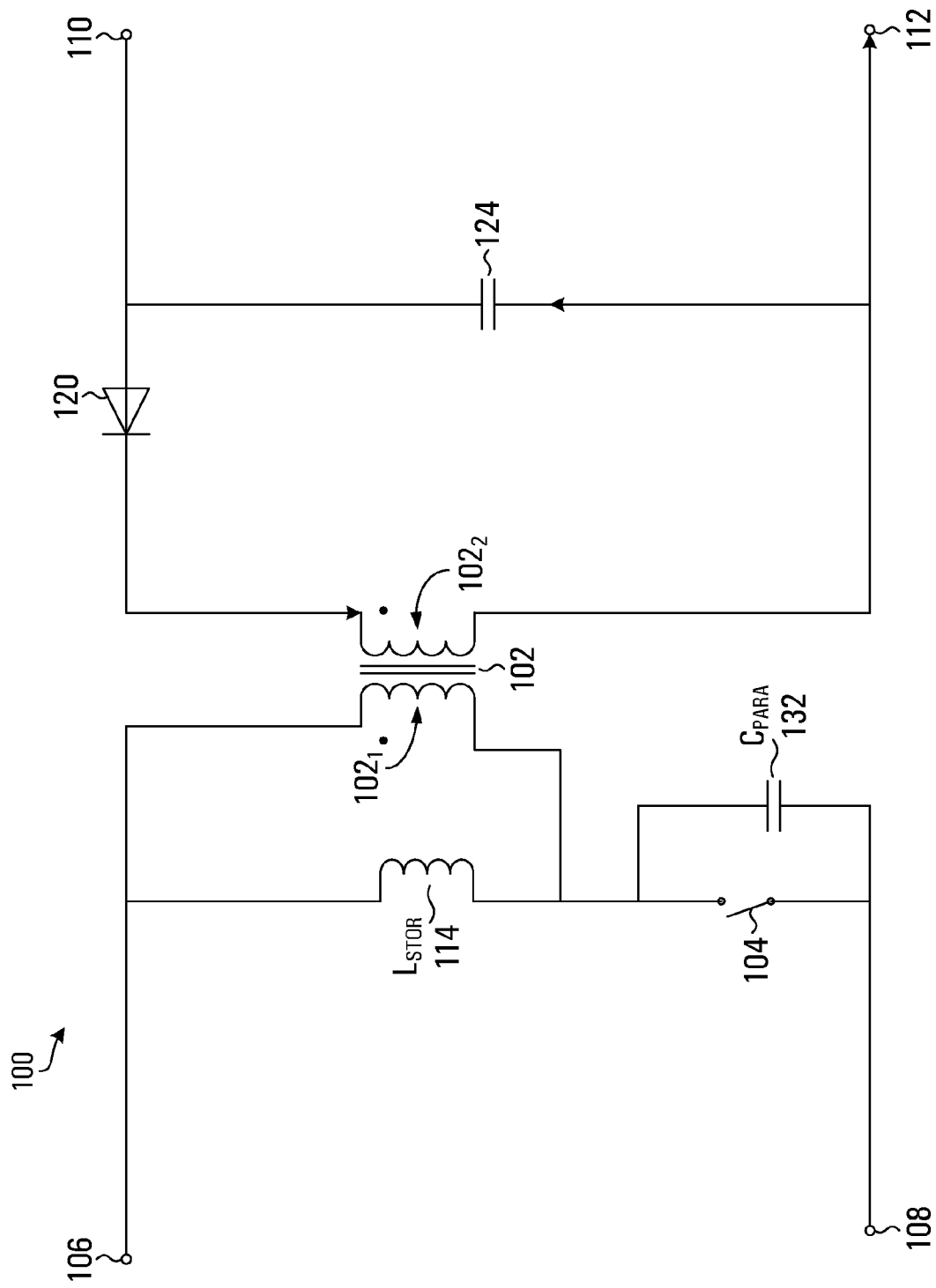
FIG. 1 is a schematic diagram of an example flyback converter circuit.

FIG. 1 is a schematic diagram of an example flyback converter circuit.

Flyback converter 100 comprises transformer 102, primary switch 104, secondary diode 120 and output capacitance 124. Transformer 102 comprises primary winding $102_1$ and secondary winding $102_2$. Primary winding $102_1$ is coupled at one end to terminal 106 of input terminal pair 106, 108. The other end or terminal of primary winding $102_1$ is coupled to the primary switch 104, which switchably couples the primary winding $102_1$ to terminal 108. The operation of switch 104 is controlled by a control means which has not been shown. Primary switch 104 is in parallel with parasitic capacitance 132. In one embodiment in which primary switch 104 is a power Metal Oxide Semiconductor Field Effect Transistor (MOSFET), the major contribution to parasitic capacitance 132 is the source-drain capacitance of the power MOSFET.

Transformer 102 provides energy storage, and optionally voltage multiplication. Transformer 102 has a turns ratio of N, where N is the ratio of the number of turns in the secondary winding $102_2$ to the number of turns in the primary winding $102_1$. Transformer 102 has been drawn with a single secondary winding $102_2$ in FIG. 1. However, flyback converters having multiple secondary windings are also possible.

Transformer 102 has a storage inductance $L_{STOR}$ 114 coupled across its primary winding $102_1$. The transformer's secondary winding $102_2$ is coupled at one end to terminal 112 of output terminal pair 110,112. The other end or terminal of the secondary winding $102_2$ is coupled to terminal 110 of output terminal pair 110, 112 through diode 120. Output capacitor 124 is coupled across the output terminal pair 110, 112 and provides energy storage and low pass filtering.

Transformer 102 in FIG. 1 has been drawn as an ideal transformer with no parasitic elements. An actual transformer has a number of parasitic elements. A parasitic element that is exploited in the operation of a flyback converter is the transformer's magnetisation inductance. The magnetisation inductance $L_M$ of a transformer appears in parallel with its primary winding. The current drawn by $L_M$ represents the current required to magnetise the transformer's core. Transformers are normally designed to maximize the value of $L_M$ since the larger the value of $L_M$, the smaller the magnetisation current. In a flyback converter however, the magnetisation inductance is used to store energy during the first part of the flyback cycle. In a flyback converter $L_M$ is frequently deliberately decreased to increase the magnetisation current and hence the energy storage capacity of the transformer. In one embodiment $L_M$ is decreased by inserting a small air gap into the transformer core to increase its reluctance and increase its magnetizing current. In many embodiments of a flyback converter, the transformer's magnetisation inductance can be made sufficiently small such that no external storage inductor is required. Thus, in many embodiments of a flyback converter, storage inductance 114 in FIG. 1 is simply the intrinsic magnetisation inductance of transformer 102 and is not an external discrete inductor.

Figure 2:
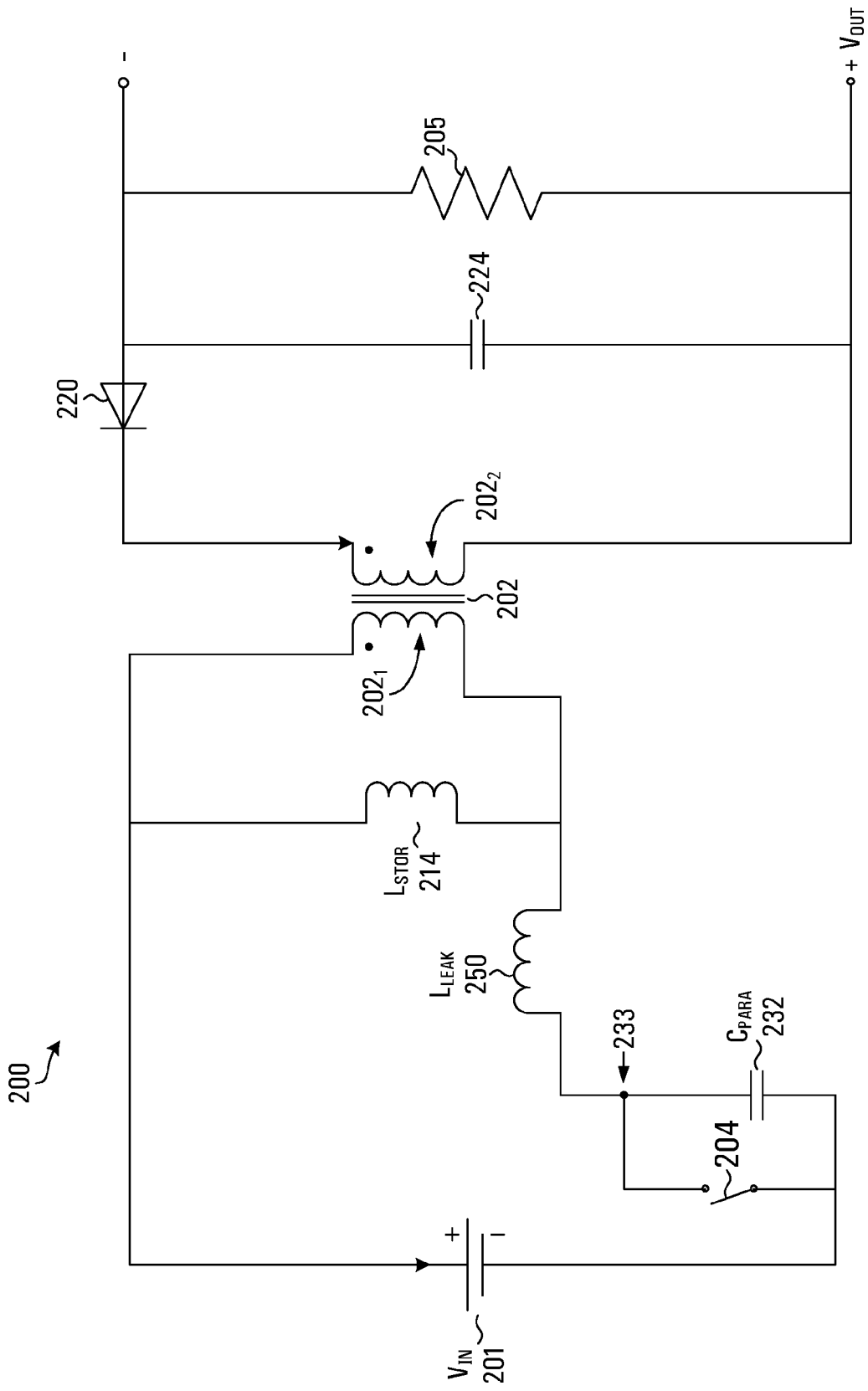
FIG. 2 is a schematic diagram of a flyback converter connected to a voltage source and a load.

FIG. 2 is a schematic diagram of a flyback converter connected to a voltage source and a load. DC voltage source 201 supplies power to the flyback converter 200 at DC voltage $V_{IN}$. Resistive load 205 receives power from the flyback converter at an output voltage $V_{OUT}$, usually different from $V_{IN}$. Also shown in FIG. 2 is the leakage inductance of the transformer 202, $L_{LEAK}$ 250. Leakage inductance results from imperfect coupling between the primary and secondary windings $202_1$ and $202_2$ of a transformer 200 and is an intrinsic component of any real transformer. Like the flyback converter 100 (FIG. 1), the example flyback converter 200 also includes a primary switch 204 in parallel with parasitic capacitance 232, a secondary diode 220, and output capacitance 224.

The operation of a flyback converter can be divided into two phases, including a charge phase and a discharge phase. In the charge phase, energy is taken from the input voltage source and stored in the magnetisation inductance of the transformer. In the discharge phase, the stored energy is transferred into the converter's load. There is optionally a third "quasi-resonant" phase following the discharge phase when the stored energy has been completely transferred into the load but the charge phase has not yet begun again. There is no net energy transfer between the input and output of a flyback converter during the quasi-resonant phase. The quasi-resonant phase could be useful, for example, when the converter's input power is very low. For example, in the early morning or late evening, the output power of a solar panel will typically be very low compared to midday. The converter should be able to function at low power to keep the panel at its Maximum Power Point (MPP).

The flyback converter charge phase of the example converter 200 begins with the closing of primary switch 204. At the beginning of the charge phase, the output capacitance 224 is already charged to a voltage $V_{OUT}$. When primary switch 204 is closed, current begins to flow into storage inductance 214 to magnetise the transformer 202. No current flows in the transformer's secondary winding $202_2$ however, since diode 220 is reverse biased and blocks the flow of current. The storage current $I_M$ in the storage inductance 214 increases linearly with time (t) and is given by the formula:

$$I_M = V_{IN} \times \frac{t}{L_{STOR}}$$

The charge phase ends and the discharge phase begins with the opening of primary switch 204. During the discharge phase the energy that was stored in storage inductance $L_{STOR}$ 214 during the charge phase will be transferred into load 205 and output capacitance 224. When switch 204 opens the voltage across transformer 202 reverses polarity and diode 220 becomes forward biased. This allows current to flow in the secondary winding $202_2$. The effect of storage inductance $L_{STOR}$ 214 can be modeled as an equivalent inductance $L'_{STOR}$ of value $N^2 L_{STOR}$ in the output circuit. With diode 220 forward biased $L_{STOR}'$ discharges into load 205 and output capacitance 224.

Clamps

An issue with flyback converters is the large voltage developed at node 233 (commonly referred to as the "drain" node) when primary switch 204 is opened. The drain voltage is the sum of the input voltage ($V_{IN}$), the voltage developed across storage inductance 214 and the voltage developed across leakage inductance 250. A high drain voltage may undesirably stress primary switch 204. Another issue with a flyback converter is the energy loss associated with the transformer's leakage inductance. When switch 204 is opened, the energy stored in storage inductance 214 is transferred into secondary winding $202_2$. The energy stored in leakage inductance 250 is not transferred, however. Leakage inductance 250 is in series with the storage inductance 214 during the flyback converter's charge phase and also carries the storage current $I_M$. Unlike the storage inductance 214 however, leakage inductance 250 is not coupled to the secondary winding $202_2$. With primary switch 204 open, leakage inductance 250 will resonate with the parasitic capacitance 232. Since the parasitic capacitance 232 is typically quite small, the resonance will have a high frequency of oscillation and the energy stored in $L_{LEAK}$ 250 will rapidly dissipate, decreasing the converter's efficiency. The peak voltage will also be large, stressing primary switch 204.

To increase converter efficiency and decrease stress on primary switch 204, a "clamp" circuit is frequently coupled across the transformer's primary winding $202_1$.

Active Clamp

Figure 3A:
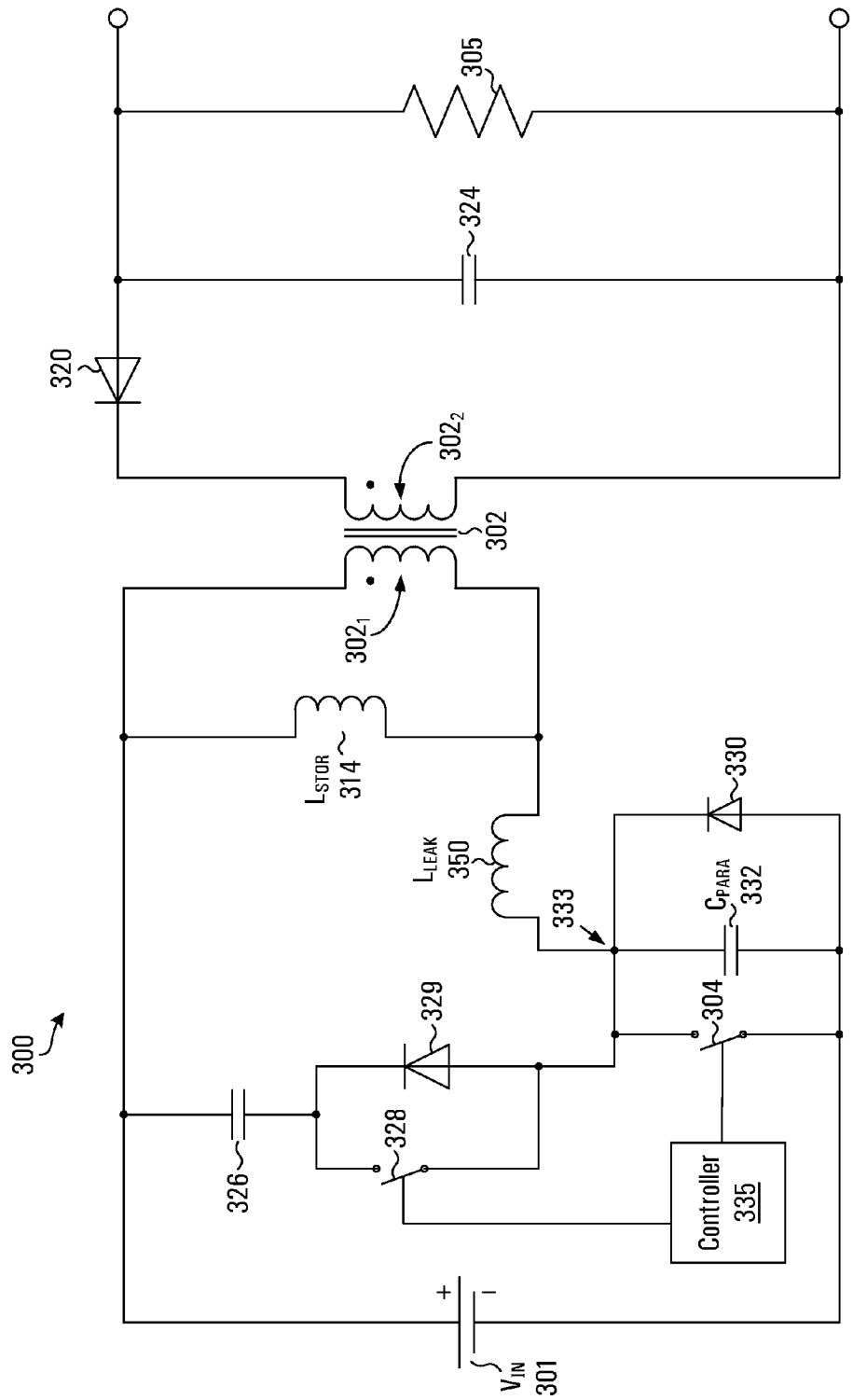
FIG. 3A is a schematic diagram of an example flyback converter with an active clamp circuit.

There are a variety of types clamp circuits. FIG. 3A is a schematic diagram of an example flyback converter with an active clamp circuit. Clamp capacitance 326 is coupled in a circuit path with clamp switch 328. Clamp switch 328 is coupled across the diode 329. Clamp switch 328 and diode 329 can be implemented in a variety of ways. In one embodiment, clamp switch 328 is an N type MOSFET and diode 329 is the intrinsic diode formed by the P-type body and N type drain of the MOSFET.

The circuit path of the clamp circuit, which includes the clamp capacitance 326, clamp switch 328 and diode 329, is coupled across the primary transformer winding $302_1$ in the example shown, to form an active clamp. Clamp switch 328 is controlled by a control means, such as a switch driver or controller 335, which could also control the converter primary switch 304.

Apart from the addition of an active clamp circuit 335, the example converter 300 is substantially the same as the example converter 200 (FIG. 2), including a primary switch 304 in parallel with parasitic capacitance 332, a transformer 302 with primary and secondary windings $302_1$, $302_2$, magnetisation inductance which acts as storage inductance 314, and leakage inductance 350, a secondary diode 320, output capacitance 324, and load 305. A power supply 301 supplies input power at a voltage $V_{IN}$. An intrinsic diode 330 is also shown in FIG. 3A.

Figure 3B:
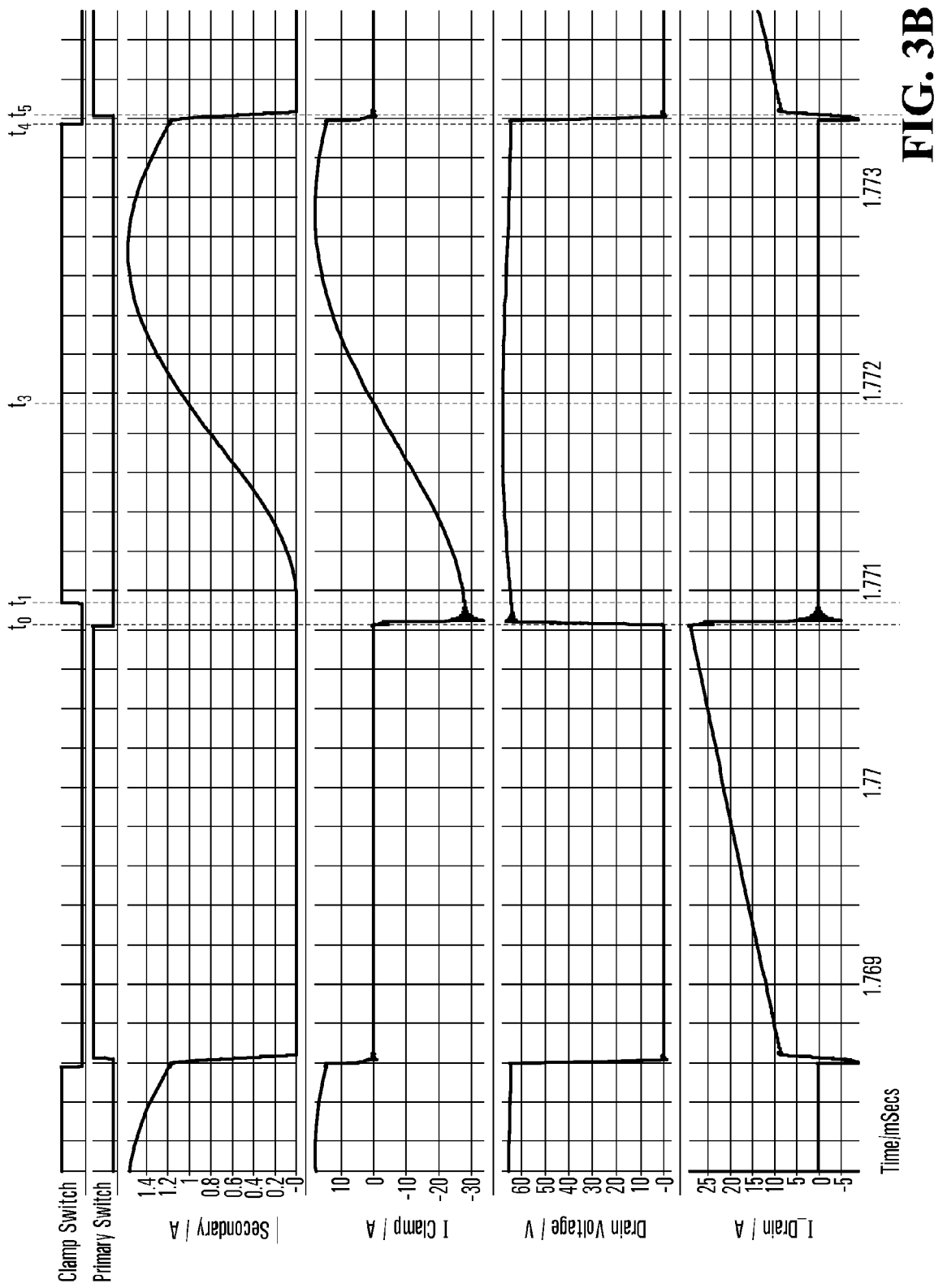
FIG. 3B shows simulation plots of drain voltage, drain current, secondary current, and clamp current versus time during conventional operation of the active clamp circuit in the converter of FIG. 3A.

FIG. 3B shows simulation plots of drain voltage, drain current, secondary current, and clamp current versus time during conventional operation of the active clamp circuit in the converter of FIG. 3A. Drain current is defined as current flowing into node 333 from leakage inductance 350. Clamp current is defined as current flowing out of clamp capacitance 326 through clamp switch 328 or, for negative clamp current, flowing into clamp capacitance 326 through the clamp switch 328 and/or diode 329. Secondary current is defined as current flowing into secondary winding $302_2$ from diode 320. The simulation was done using a commercially available simulation package. The values of the magnetisation inductance 314, leakage inductance 350, primary switch parasitic capacitance 332, clamp capacitance 326, output capacitance 324 and load 305 were 3.7 uH, 100 nH, 2.3 nF, 4.7 uF, 1 uF and 1.15 kohms respectively. The transformer turns ratio was 20 and the voltage $V_{IN}$ of input voltage source 301 was 45 V.

It should be appreciated that the simulation plots shown in FIG. 3B are for illustrative purposes only. Similar or different waveforms could be observed under different simulation conditions or operation of a converter. Example simulation conditions are provided herein, and other conditions could be used in simulations and/or in actual circuits. This applies to all simulation plots shown in the drawings.

At the beginning of the discharge phase (time $t_0$) the previously closed primary switch 304 is opened by controller 335. As a consequence, the voltage of drain node 333 rises. In this simulation clamp switch 328 is a power MOSFET with an intrinsic diode 329. The rise in drain voltage forward biases the diode 329 and clamp current begins to flow immediately. A short time later, at time $t_1$ the previously open clamp switch 328 is closed by the controller 335. The closing of clamp switch 328 is preferably delayed until its intrinsic diode 329 has begun to conduct since this reduces the switching loss of clamp switch 328.

FIG. 3C is a schematic drawing of an equivalent circuit of the converter of FIG. 3A with the clamp switch closed and the primary switch open. Current flows through storage inductance 314 and leakage inductance 350 into clamp capacitance 326 through closed clamp switch 328. Current also flows into parasitic capacitance 332. However, the additional capacitance of clamp capacitance 326 limits the voltage rise of drain node 333 as well as the frequency of the resonance.

The voltage across storage inductance 314 is just the reflected output voltage $V_{OUT}/N$ and can be made substantially constant by correctly sizing output capacitance 324. Clamp capacitance 326, parasitic capacitance 332, leakage inductance 350 and storage inductance 314 constitute a resonant circuit. Initially, current flows into clamp capacitance 326 and parasitic capacitance 332 from leakage inductance 350. However, at time $t_3$ in FIG. 3B the current then reverses direction and begins to flows back into leakage inductance 350 and storage inductance 314. This reverse current flowing into the storage inductance 314 will induce additional current in the secondary winding $302_2$ and increases the efficiency of the converter. The frequency of the resonance is primarily determined by the values of clamp capacitance 326, parasitic capacitance 332 and leakage inductance 350. Storage inductance 314 is shunted by output capacitance 324 through the transformer 300 and does not significantly affect the resonant frequency.

In conventional operation of the active clamp circuit, clamp switch 328 is then opened during a period of this reverse current flow at time $t_4$ and prior to the closing of primary switch 304.

FIG. 3D is schematic drawing of an equivalent circuit of the converter of FIG. 3A when the clamp switch is opened but before the primary switch is closed. Leakage inductance 350 and storage inductance 314 are now in a circuit path with the relatively small parasitic capacitance 332 of primary switch 304. The current flowing in leakage inductance 350 and storage inductance 314 rapidly discharges capacitance 332 and brings the voltage of drain node 333 substantially to zero. Intrinsic diode 330 prevents the node voltage going more than a diode drop negative. The closing of primary switch 304 to begin the next charge phase is timed to coincide with the voltage of drain node 333 reaching zero. This "Zero Voltage Switching" minimizes the switching loss associated with closing of primary switch 304 and discharge of parasitic capacitance 332.

Dissipative Clamp

Figure 4A:
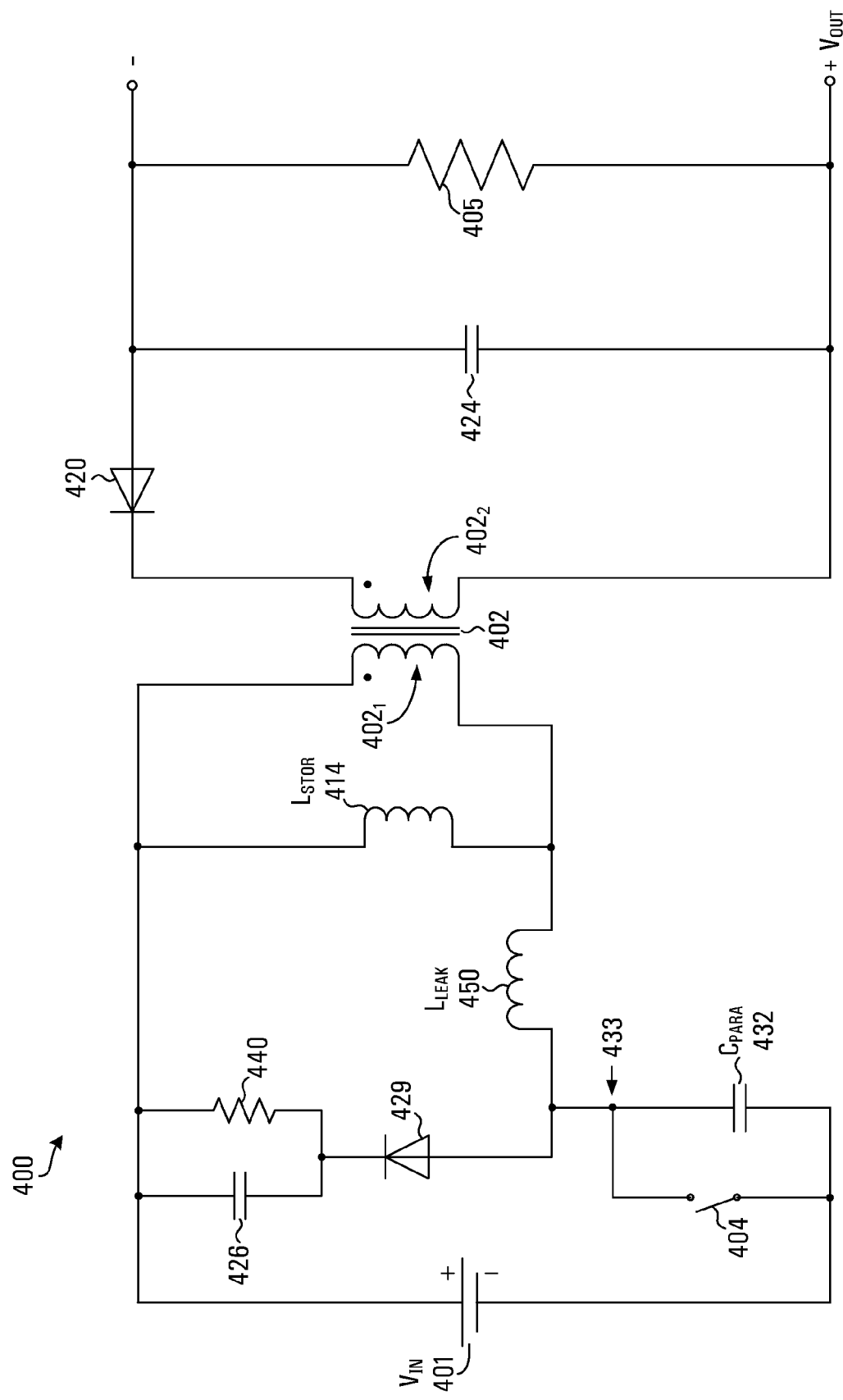
FIG. 4A is a schematic diagram of an example flyback converter using a snubber circuit.

In another version of the flyback converter, a dissipative clamp or "snubber" circuit is used. FIG. 4A is a schematic diagram of an example flyback converter using a snubber circuit. The snubber circuit consists of snubber diode 429, snubber capacitance 426 and snubber resistance 440. The example converter 400 is otherwise substantially the same as the example converter 200 (FIG. 2), including a primary switch 404 in parallel with parasitic capacitance 432, a transformer 402 with primary and secondary windings $402_1$, $402_2$, magnetisation inductance which acts as storage inductance 414, and leakage inductance 450, a secondary diode 420, output capacitance 424, and load 405. A power supply 401 supplies input power at a voltage $V_{IN}$.

In a similar manner to an active clamp circuit, when primary switch 404 is opened at the end of the flyback charge phase the snubber diode 429 becomes forward biased and current flows into snubber capacitance 426, limiting the rise of the voltage at drain node 433. The snubber capacitance 426 is discharged through snubber resistance 440 during the charge phase when primary switch 404 is closed and snubber diode 429 is reverse biased.

The dissipative clamp active flyback converter has a disadvantage of reduced power efficiency compared to the active clamp flyback converter, since power is dissipated in snubber resistance 440.

This dissipative clamp active flyback converter can however be operated in quasi-resonant or "bursting" mode. In quasi-resonant mode the magnetisation inductance 414 is allowed to completely discharge during the flyback converter discharge phase. This causes the secondary diode 420 to come out of conduction. The magnetisation inductance 414 resonates with the parasitic capacitance of diode 420.

Figure 4B:
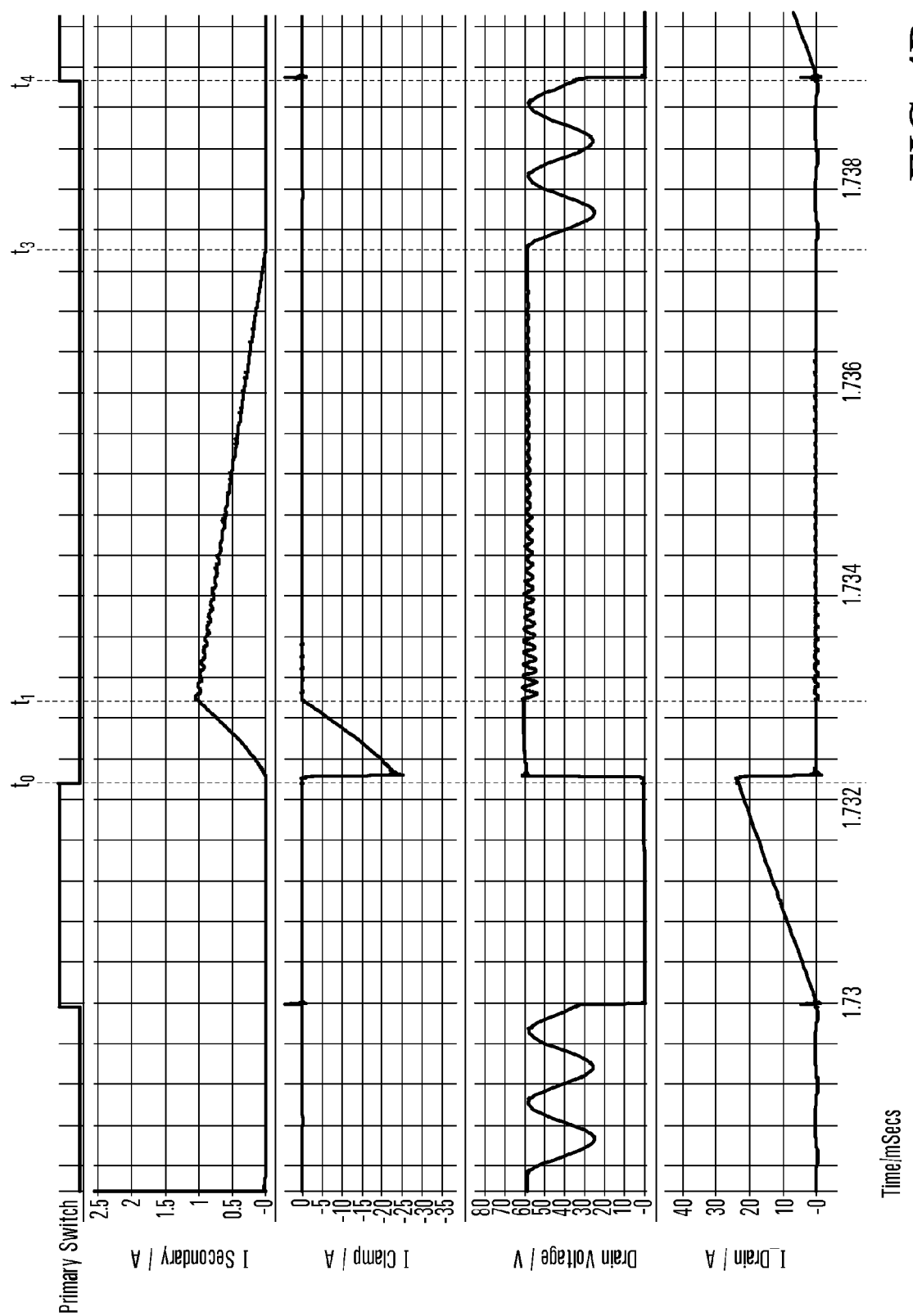
FIG. 4B shows simulation plots of drain voltage, drain current, clamp current and secondary current versus time for a flyback converter with a dissipative clamp operated in quasi-resonant mode.

FIG. 4B shows simulation plots of drain voltage, drain current, clamp current and secondary current versus time for a flyback converter with a dissipative clamp operated in quasi-resonant mode. The simulation was done using a commercially available simulation package. The values of the magnetisation inductance 414, leakage inductance 450, primary switch capacitance 432, clamp capacitance 426, clamp resistance 440, output capacitance 424 and load 405 were 3.7 uH, 100 nH, 2.3 nF, 4.7 uF, 18 ohms, 1 uF and 1.15 kohms respectively. The transformer turns ratio was 20 and the voltage $V_{IN}$ of the input voltage source 401 was 45 V.

Drain current is defined as current flowing into node 433 from leakage inductance 450. Clamp current is defined as current flowing in a direction out of capacitance 426 and resistance 440 into diode 429. In this example, clamp current will be negative or zero, due to the presence of diode 429 without a parallel switch or other circuit path to carry clamp current in the positive direction. Secondary current is defined as current flowing into secondary winding $402_2$ from diode 420. At time $t_0$ primary switch 404 is opened, the voltage of drain node 433 rises and snubber diode 429 becomes forward biased. Current flows into the snubber capacitance 426. At time $t_1$ snubber capacitance 426 is sufficiently charged to reverse bias the snubber diode 429 and clamp current ceases. Secondary current continues to flow as the magnetisation inductance 214 discharges. At time $t_3$ the magnetisation inductance 414 is completely discharged and secondary current falls substantially to zero. Secondary diode 420 comes out of conduction and the flyback converter enters quasi-resonance. The magnetisation inductance 414 resonates with the parasitic capacitance 432 of the primary switch 404 as well as any additional parasitic capacitances associated with snubber diode 429 or secondary diode 420. No net energy transfer takes place between the input and output during this period. This quasi-resonance period is used to extend the low power performance of the flyback converter. By including the quasi-resonance period, the switching frequency of the flyback converter can be easily varied and the duty cycle (ratio of the ON time of the primary switch 404 to the switching period) decreased to a very low value.

It is desirable to close primary switch 404 to begin the next charge phase at a minimum of the drain voltage. This is referred to as "valley switching". Valley switching minimizes the switching loss from the shorting of parasitic capacitance 432 on the closing or primary switch 404. It is important to note that unlike in the previously described active clamp case, the drain voltage is not zero when primary switch 404 closes. Thus, valley switching results in switching losses from the discharge of parasitic capacitance 432, unlike the active clamp case where the drain voltage is substantially zero.

The previously described example active clamp flyback converter 300 (FIG. 3A) however, cannot be easily operated in quasi-resonance. The clamp switch 328 can only be opened to discharge the drain node 333 when there is sufficient current in the leakage inductance 350 to do so. Once the storage inductance 314 has discharged completely however, the only current in the leakage inductance 350 is the sinusoidal resonant current. Since this current is time varying there will be significant periods of time during which there is insufficient current to discharge the drain node 333 (for instance, 50% of the time the current will actually be negative and charging rather than discharging the drain node). In addition, this resonant current will eventually dissipate due to resistive losses, which reduces power efficiency and further limits the switching frequency.

Novel Active Clamping

In an embodiment of the present disclosure, the active clamp circuit of the example flyback converter 300 of FIG. 3A is operated in a different manner, to allow zero voltage switching of the primary switch and increased efficiency while at the same time allowing the flyback converter to be operated in quasi-resonant mode for improved low power performance.

Figure 4C:
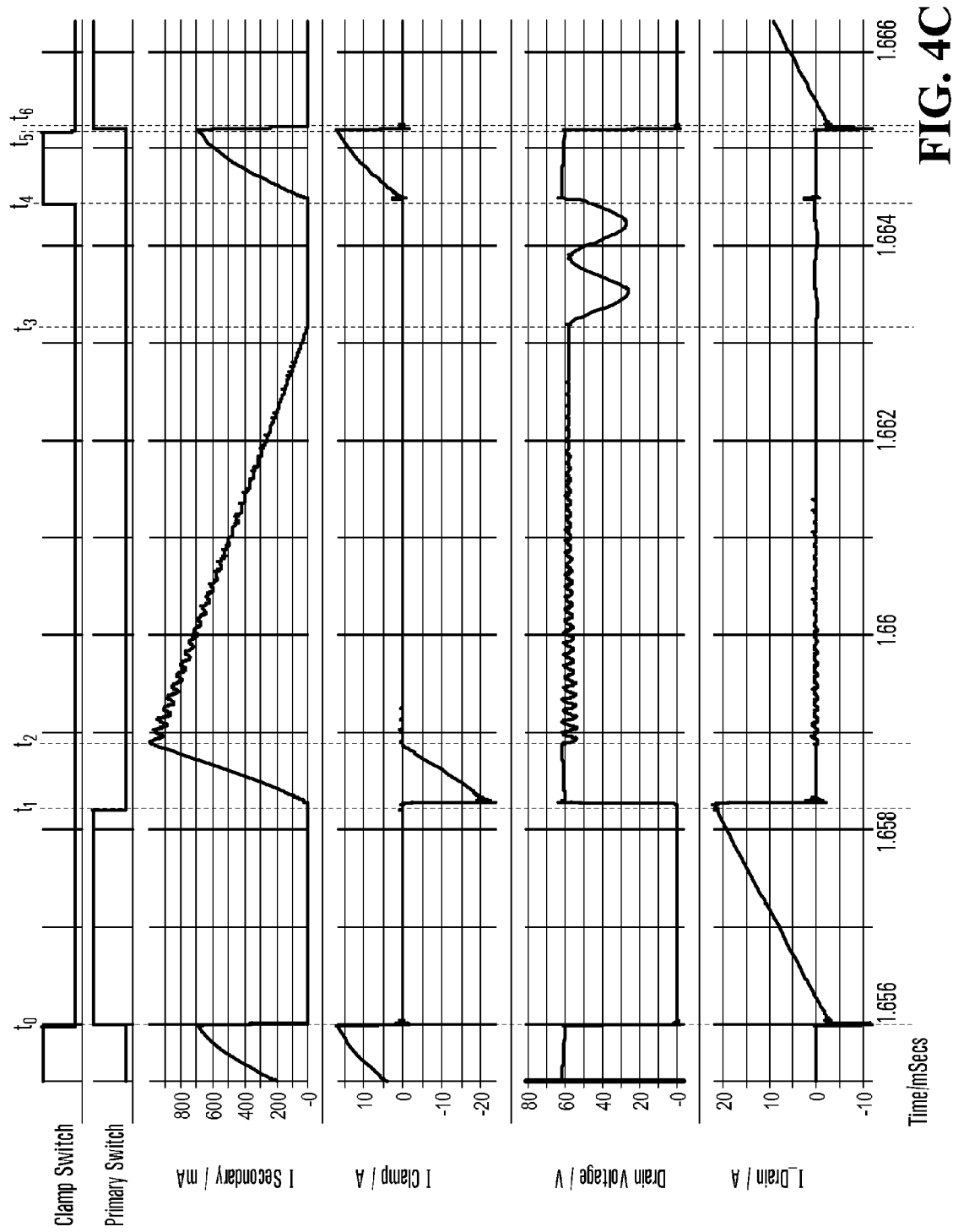
FIG. 4C shows simulation plots of drain current, clamp current, drain voltage and secondary current versus time of a converter with an active clamp circuit operated in accordance with an embodiment disclosed herein.

FIG. 4C shows simulation plots of drain current, clamp current, drain voltage and secondary current versus time of a converter with an active clamp circuit operated in accordance with an embodiment disclosed herein. The waveforms were generated using a commercially available simulation package. The values of clamp capacitance 326 and parasitic capacitance 332 were 4.7 uF and 2.3 nF respectively. The values of storage inductance 314 and leakage inductance 350 were 100 nH and 3.7 uH, respectively. The voltage $V_{IN}$ of input voltage supply 401 was 45 volts.

Drain current is defined as current flowing into node 333 from leakage inductance 350. Clamp current is defined as current flowing out of clamp capacitance 326 through clamp switch 328 or diode 329. Clamp current is defined as current flowing out of clamp capacitance 326 through switch 328 or, for negative clamp current, flowing into clamp capacitance through the switch 328 and/or diode 329. Secondary current is defined as current flowing into secondary winding $302_2$ from diode 320.

At time $t_0$ primary switch 304 is closed by controller 335 and the flyback charge phase begins. The drain current through primary switch 304 rises linearly with time. The voltage at drain node 333 is zero and secondary and clamp currents are substantially zero.

At time $t_1$ primary switch 304 is opened by controller 335, the drain current drops substantially to zero and the voltage of drain node 333 immediately rises from zero to a value of roughly $V_{IN}+V_{OUT}/N$, forward biasing clamp diode 329 and allowing current to flow into clamp capacitance 326. Current also begins to flow in the secondary winding $302_2$ as diode 320 becomes forward biased.

Figure 5A:
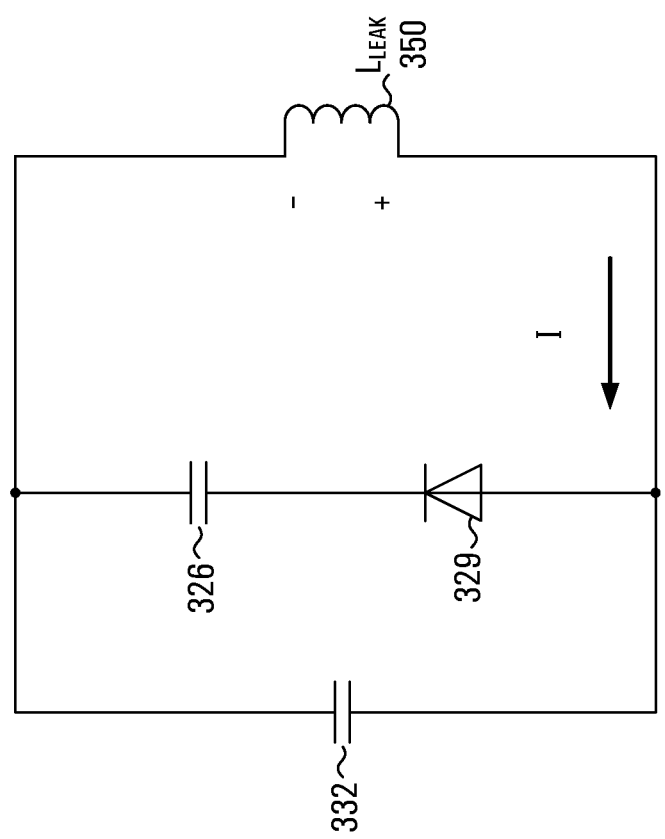
FIG. 5A is a schematic diagram of an equivalent circuit of an example converter with an active clamp circuit at the beginning of a discharge phase when the clamp switch is opened.

Unlike in conventional active clamp operation, clamp switch 326 remains open. FIG. 5A is a schematic diagram of an equivalent circuit of an example converter with an active clamp circuit at the beginning of a discharge phase when the clamp switch is opened. With diode 329 forward biased, current flows into clamp capacitance 326 and parasitic capacitance 332. The voltage rise of node 333 is therefore limited by the clamp capacitance 326. Storage inductance 314 is shunted by the output capacitance 324 and is not shown in the equivalent circuit.

Clamp capacitance 326 and parasitic capacitance 332 form a resonant circuit with leakage inductance 350. The voltage of clamp capacitance 326 will increase as resonant current flows into it. Unlike in a conventional active clamp circuit, however, diode 329 will prevent the current from reversing. Thus, at time $t_2$ in FIG. 4C, diode 329 becomes reverse biased and clamp current flow ceases. The energy stored in the clamp capacitance 326 in this operation is usefully employed later in the flyback cycle.

Subsequently, at time $t_3$ in FIG. 4C, the storage inductance 314 has completely discharged, the secondary current falls to zero, secondary diode 320 stops conducting and the flyback converter enters quasi-resonance as described previously.

Figure 5C:
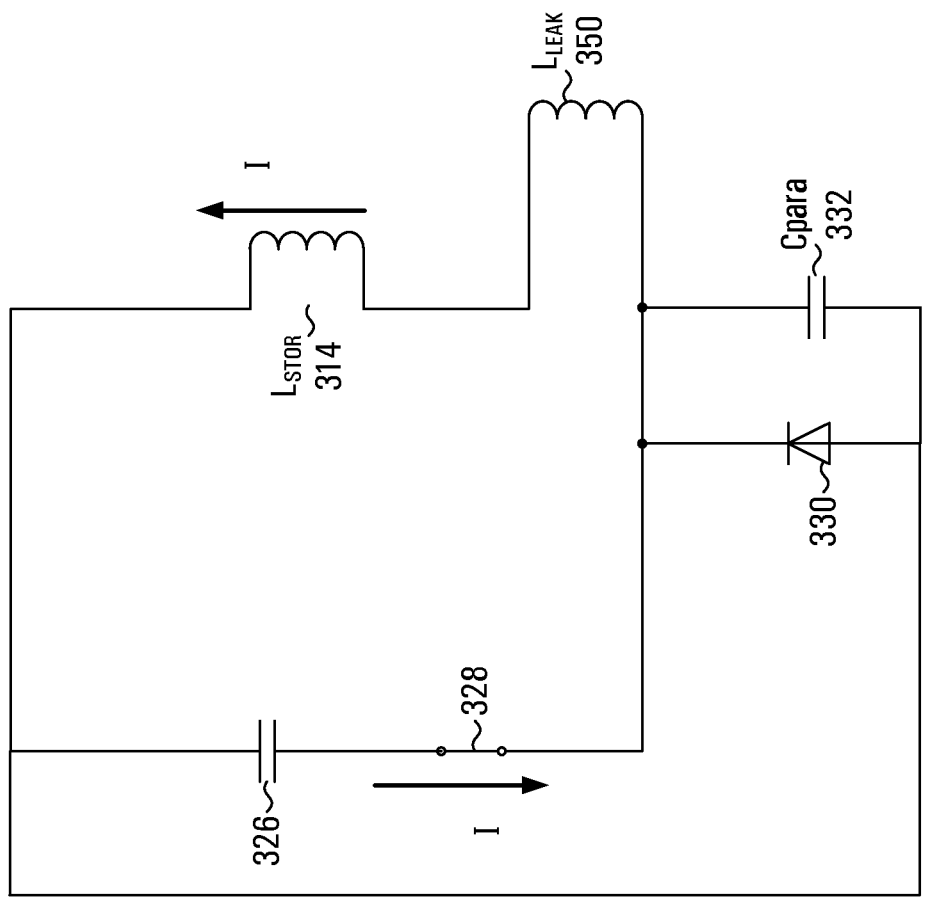
FIG. 5C is a schematic diagram of an equivalent circuit of the example flyback converter primary circuit with the clamp switch closed.
Figure 5B:
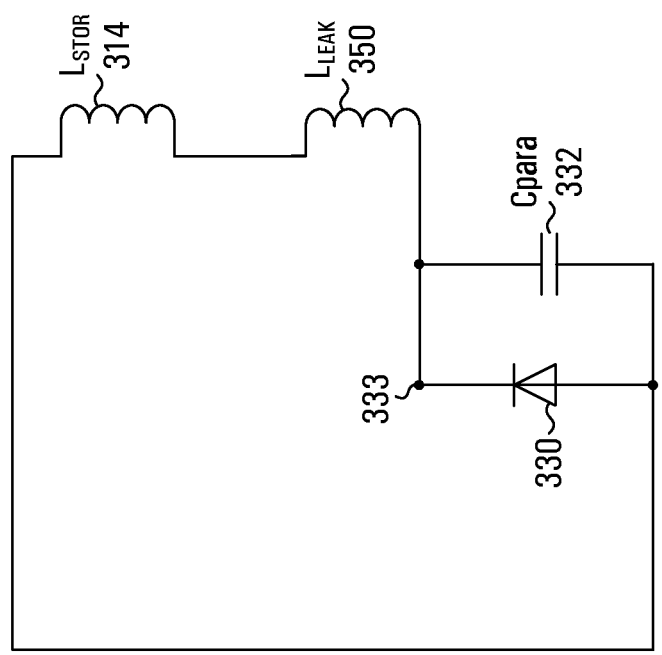
FIG. 5B is a schematic diagram of an equivalent circuit of an example flyback converter primary circuit in quasi-resonance.

FIG. 5B is a schematic diagram of an equivalent circuit of an example flyback converter primary circuit in quasi-resonance. Clamp switch 328 is still open, clamp diode 329 is reverse biased and therefore clamp capacitance 326 is isolated and not shown. Storage inductance 314 is no longer shunted by output capacitance 324 and appears in a circuit path with leakage inductance 350. The storage inductance 314 and leakage inductance 350 resonate with the parasitic capacitance 332, producing a time varying sinusoidal voltage on drain node 433 as shown in FIG. 4C.

At time $t_4$ in FIG. 4C, clamp switch 328 is closed by the controller 335. This allows the resonant current whose flow was interrupted by the reverse biasing of diode 329 at time $t_2$ to resume. The charge stored on clamp capacitance 326 now flows back through closed clamp switch 328 into leakage inductance 350 and storage inductance 314. This current is coupled into secondary winding $302_2$ forward biasing secondary diode 320 and causing secondary current to flow, increasing the efficiency of the converter.

FIG. 5C is a schematic diagram of an equivalent circuit of the example flyback converter primary circuit with the clamp switch closed.

Figure 5D:
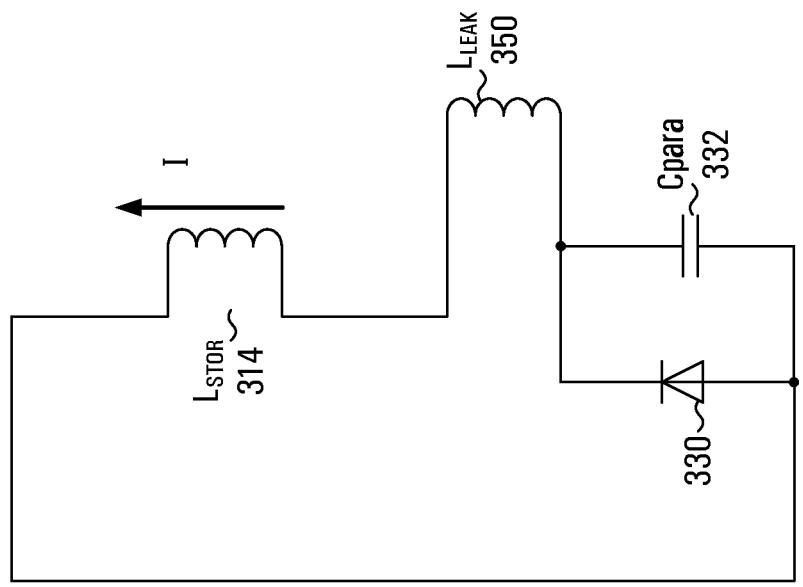
FIG. 5D is a schematic diagram of an equivalent circuit of an input circuit with the clamp switch open.

Subsequently, at time $t_5$ in FIG. 4C, clamp switch 328 is opened. FIG. 5D is a schematic diagram of an equivalent circuit of an input circuit with the clamp switch open. Clamp capacitance 326 is no longer in the circuit since switch 328 is open and diode 329 is still reverse biased. Storage inductance 314 and leakage inductance 350 are in a circuit path with the parasitic primary switch capacitance 332. The current flow in these inductances rapidly removes the charge stored on parasitic capacitance 332 and reduces the voltage of node 333 to substantially zero. The built in diode 330 across parasitic capacitance 332 prevents the node 333 from going more than a diode drop less than zero. At time $t_6$ in FIG. 4C, when primary switch 304 is closed by the controller 335 to start the next flyback charge phase, the voltage across it is substantially zero. The switching loss from the discharge of parasitic capacitance 332 on the closing of primary switch 304 is therefore minimized.

Maxima Switching

The timing of the closure of clamp switch 328 at $t_4$ may also be beneficially chosen to reduce its switching losses by having it coincide with a local maximum of the voltage of drain node 333. Switching loss results from the discharge of the parasitic capacitance of clamp switch 328 on its closing. If clamp switch 328 is implemented with a power MOSFET, then the parasitic capacitance is predominantly the source-drain capacitance of the MOSFET. The amount of charge stored on the parasitic capacitance will be at a local minimum when the voltage of node 333 is at a local maximum. By way of example, in FIG. 4C the closing of clamp switch 328 has been timed to occur at the voltage maximum immediately preceding the closing of the primary switch 304.

In one embodiment, the temporal location of the drain voltage maxima is determined from the location of the zero crossings of the drain voltage sinusoid. The drain voltage resonates around the converter's input voltage. The point in time at which the drain voltage equals the input voltage represents the zero crossing of the sinusoid. The locations of the maxima are then a quarter period from the zero crossings. In one embodiment, a comparator circuit, in a controller for example, is used to locate the zero crossings. In one embodiment, the period of the quasi-resonant sinusoid is a stored value.

By operating the active clamp in the manner disclosed herein, the flyback converter benefits from the zero voltage switching and power efficiency of an active clamp, along with the low power performance of quasi-resonant operation.

Application to Other Converters

The application of active clamping as disclosed herein is not limited to flyback converters. The method may also or instead be usefully applied to a variety of switching converters.

Figure 6:
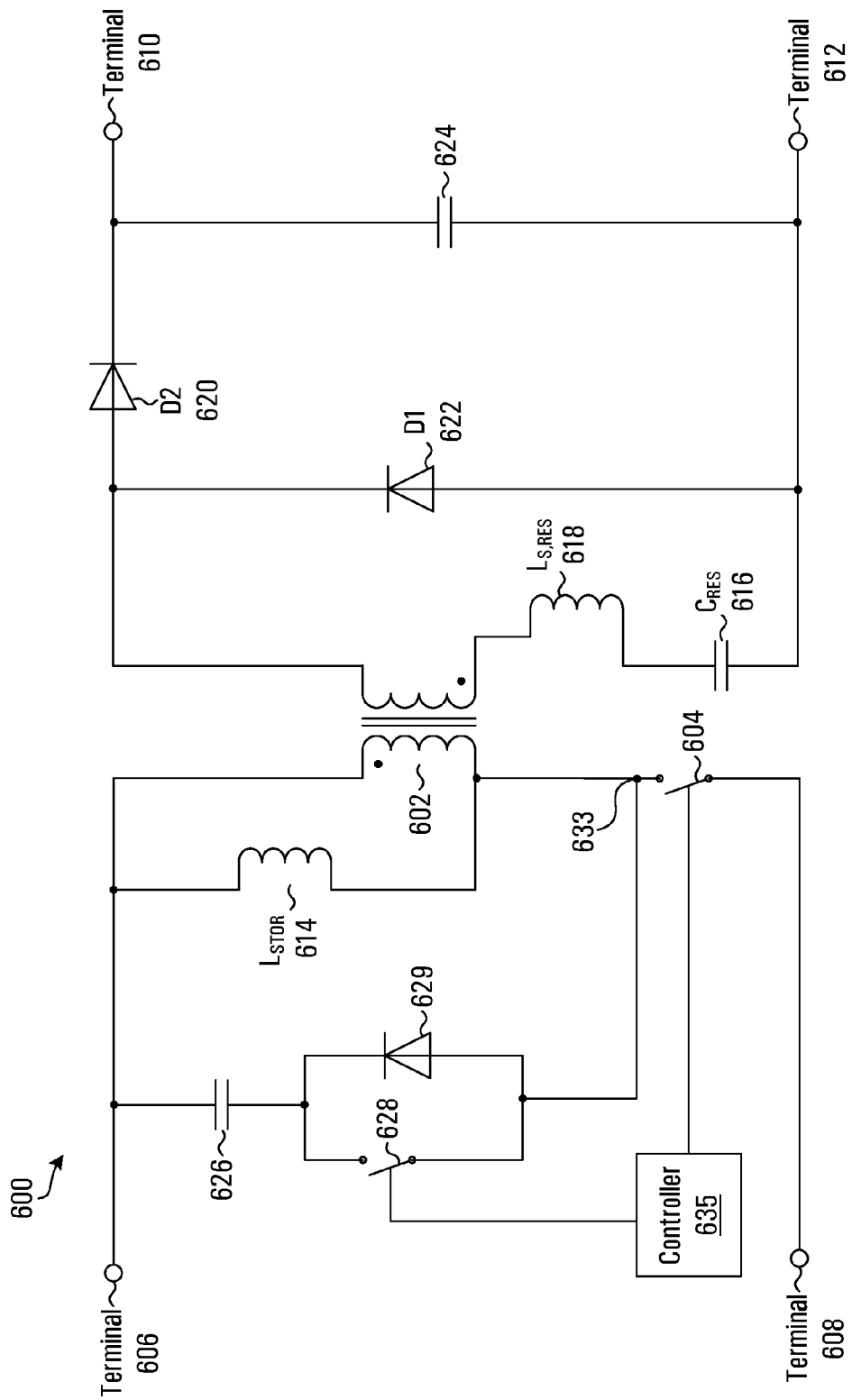
FIG. 6 is a schematic diagram of an example forward boost converter circuit using an active clamp circuit.

FIG. 6 is a schematic diagram of an example forward boost converter circuit using an active clamp circuit. Forward boost converter 600 comprises transformer 602, primary switch 604, storage inductance 614, leakage inductance 618, resonant capacitance 616, output capacitance 624 and diodes 620 and 622. The active clamp comprises capacitance 626, clamp switch 628 and diode 629. A controller 635 controls opening and closing of clamp switch 628, and also primary switch 604 in the example shown. Input terminals 606, 608 and output terminals 610, 612 are also shown.

Similar to the flyback converter, the operation of the forward boost converter 600 involves a conduction phase in which primary switch 604 is closed and energy is stored in the magnetising inductance 614 of transformer 602. In the discharge phase, primary switch 604 is opened and the energy stored in the magnetising inductance 614 is transferred into the secondary winding of the transformer 602. Similar to the flyback converter described above, the opening of primary switch 604 may result in undesirably large voltages developing on drain node 633. The active clamp circuit may be used to limit the drain node voltage and increase the conversion efficiency of the converter 600 in a similar manner to its application in the flyback converter. When primary switch 604 is opened by the controller 635, the voltage of drain node 633 will rise and forward bias diode 629. Storage inductance 614 and leakage inductance 618 will form a resonant circuit with clamp capacitance 626. Current will flow into capacitance 626 through diode 629, limiting the rise of the voltage on drain node 633. Diode 629 will prevent the resonant clamp current from reversing. Prior to the closing of the primary switch 604 to begin the next cycle, clamp switch 628 will be closed by the controller 635, allowing the resonant current to flow out of clamp capacitance 626 into storage inductance 614 and increasing the secondary current. Clamp switch 626 is then opened and the inductance current will quickly discharge the voltage on node 633 to substantially zero, allowing for zero voltage switching of primary switch 604.

Boost Converter

Figure 7:
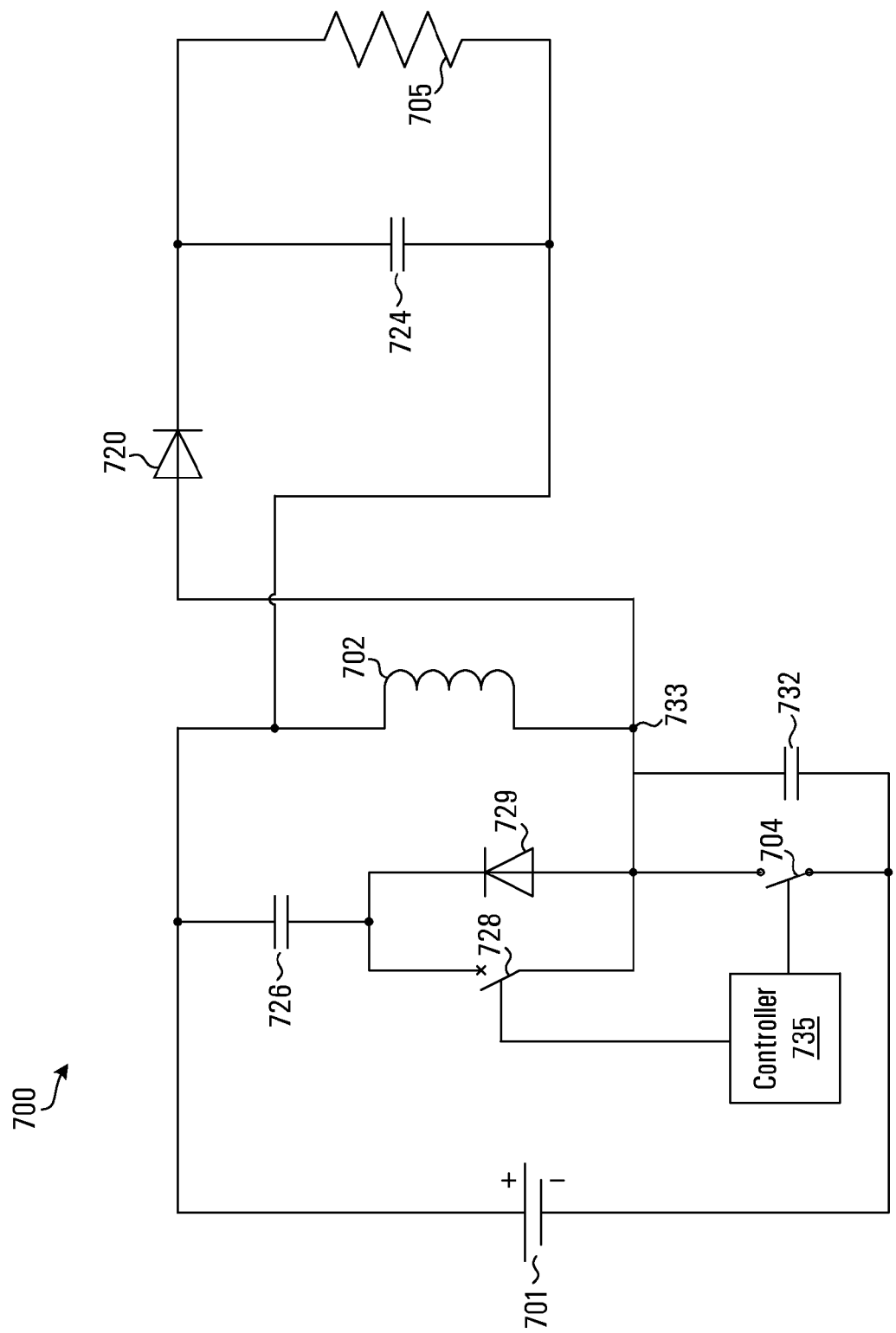
FIG. 7 is a schematic diagram of an example boost converter using an active clamp circuit.

Active clamping as disclosed herein may also or instead be used with non-isolated DC-DC converters, such as a boost converter, for example. FIG. 7 is a schematic diagram of an example boost converter using an active clamp circuit.

Boost converter 700 comprises inductance 702, converter switch 704, diode 720 and output capacitance 724. The parasitic capacitance of switch 704 is represented by capacitance 732. The converter input is coupled to DC supply 701 and the converter output is coupled to load 705. The active clamp circuit comprises clamp capacitance 726, clamp switch 728 and clamp diode 729. A controller 735 controls operation of clamp switch 728, and also converter switch 704 in the example shown.

During the converter's charge phase, inductance 702 is charged from supply 701 through closed switch 704. Diode 720 is reverse biased and no output current flows. When switch 704 is opened by the controller 735 to begin the discharge phase. the voltage at node 733 rises and clamp diode 729 becomes forward biased and conducts current into clamp capacitance 726. Diode 720 also becomes forward biased and current flows into output capacitance 724 and load 705. According to a method as disclosed herein, and similar to the operation of the previously described converters, clamp switch 728 remains open during this period. When inductance 702 has completely discharged, diode 720 becomes non-conducting and the converter 700 enters its resonant phase. Inductance 702 will resonate with the parasitic capacitance 732 of switch 704. According to one embodiment, clamp switch 728 is switched on by the controller 735 at a peak in the resonant voltage at node 733 to conserve its switching loss. Current flows from clamp capacitance 726 through closed switch 728 into inductance 702. Clamp switch 728 is then opened, and the current flowing in inductance 702 rapidly discharges parasitic capacitance 732 to bring the voltage of node 733 substantially to zero. Switch 704 is then closed to begin the next charge cycle and zero voltage switching is achieved.

As illustrated in FIG. 7, active clamping as disclosed herein need not be applied only in transformer-based power converters. A converter switch could be a primary switch such as 304 (FIG. 3A), 604 (FIG. 6) coupled to a transformer primary winding, or a switch 704 (FIG. 7) coupled to storage inductance 702. Similarly, storage inductance could be the magnetisation inductance 314, 614 of a transformer, or a separate inductance as shown at 702. Thus, references to a primary switch and magnetisation inductance in discussions of converter operation may be extended or generalized to include other forms of converter switch and storage inductance.

Drain Node Discharge Control

In a further embodiment, the discharge of the drain node in the preceding converters may be beneficially controlled to improve efficiency by varying the ON time of the clamp switch.

Figure 8:
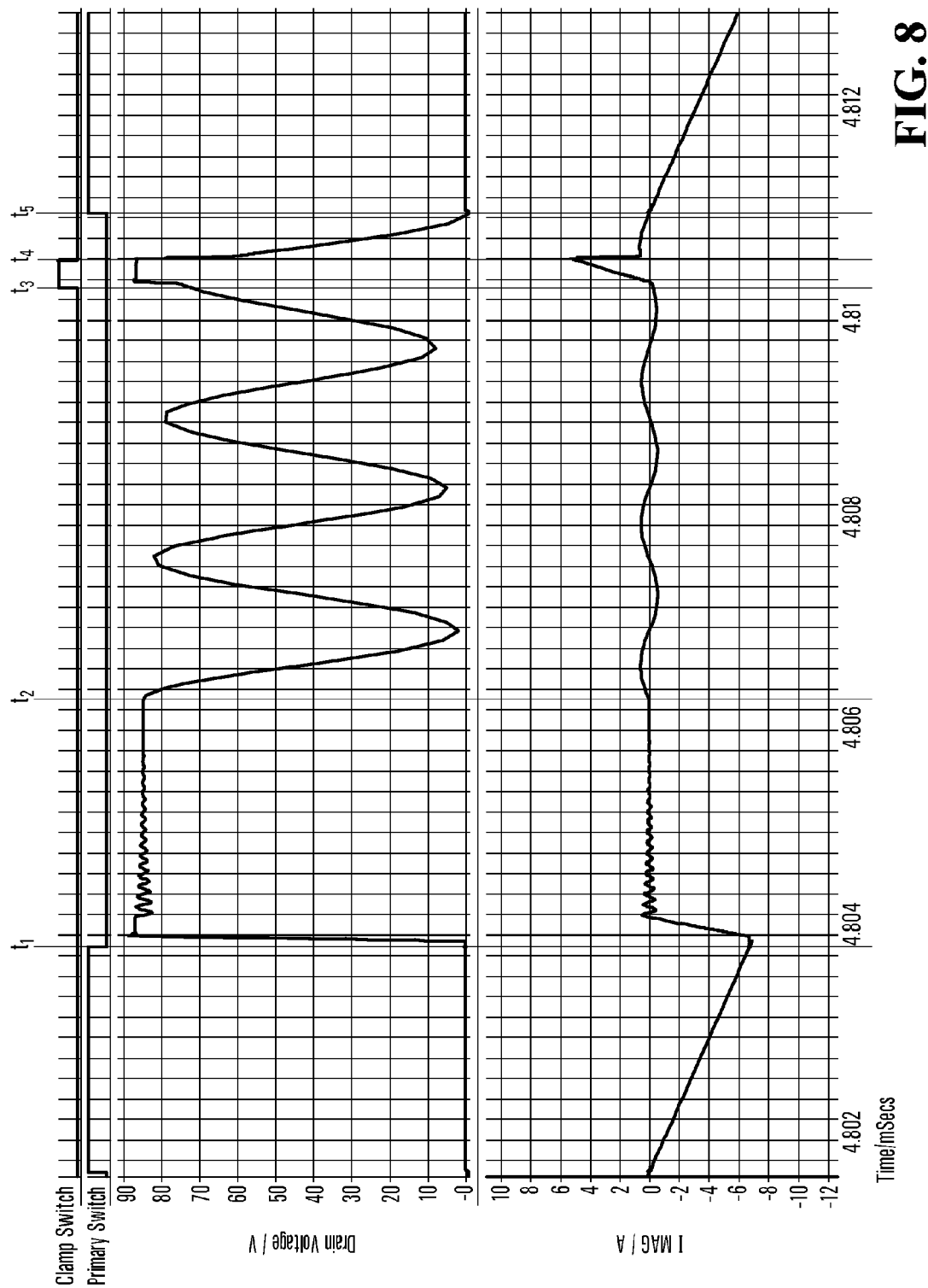
FIG. 8 shows simulation plots of drain voltage and magnetisation current versus time of the example flyback converter of FIG. 3A in operation.

FIG. 8 shows simulation plots of drain voltage and magnetisation current versus time of the example flyback converter of FIG. 3A in operation.

The simulation was done using a commercially available simulation package. The values of magnetisation inductance 314, leakage inductance 350, primary switch capacitance 332, and clamp capacitance 326 were 14 uH, 70 nH, 2.3 nF, 4.7 nC, 220 nF respectively. The turns ratio of transformer 302 was 5. The voltage $V_{IN}$ of the input supply 301 was 45 V. The magnetisation current is defined as the current flowing out of leakage inductor 350 into storage inductor 314 and primary winding $302_1$.

At time $t_1$ primary switch 304 is opened and the drain voltage at node 333 rises. At time $t_2$ the magnetisation inductance 314 has discharged and converter 300 enters quasi-resonant operation. At time $t_3$ at the third maxima of the drain voltage resonance, clamp switch 328 is closed by the controller 335. The magnetisation and leakage inductances 314 and 350 are now in a circuit path with clamp capacitance 326 and the current in the magnetisation inductance 314 begins to increase from zero. At time $t_4$ clamp switch 328 is opened and the drain voltage resonates down.

At this point the magnetisation and leakage inductances 314, 350 are resonating with the parasitic capacitance 332 of the primary switch 304. The amplitude of this resonance is proportional to the current flowing in the magnetisation inductance 314 just after the clamp switch 328 is opened. This current is approximately proportional to the ON time of the clamp switch 328 so long as the clamp switch ON time is short (illustratively <1/10th) relative to the period of the resonance of the clamp capacitance 326 and leakage and magnetisation inductances 350, 314. The amplitude of the drain voltage resonance can therefore be controlled by controlling the ON time of the clamp switch 328.

A preferred resonant condition is one in which amplitude is just large enough such that the drain voltage reaches zero at one of its resonance minima. If the drain voltage minimum does not ever reach zero then primary switch 304 will always have a voltage across it when it switches ("hard" switching), leading to energy loss. If the drain voltage minimum is less than zero, then diode 332 becomes forward biased, clamping the drain voltage to zero but also shorting parasitic capacitance 332. This results in energy loss and large recirculating currents in the magnetising inductance 314, leading to further energy loss.

If the resonant amplitude is just large enough such that the drain voltage reaches zero at a resonance minimum however, primary switch 304 can be timed to turn ON at this moment, minimizing the switching loss and achieving zero voltage switching. Additionally, the current in the magnetisation and leakage inductances 314, 350 would also be zero at the voltage minimum and zero current switching may also be achieved. The efficiency of the converter 300 can be improved by operating under these conditions.

Drain Node Discharge Control Loop

Figure 9B:
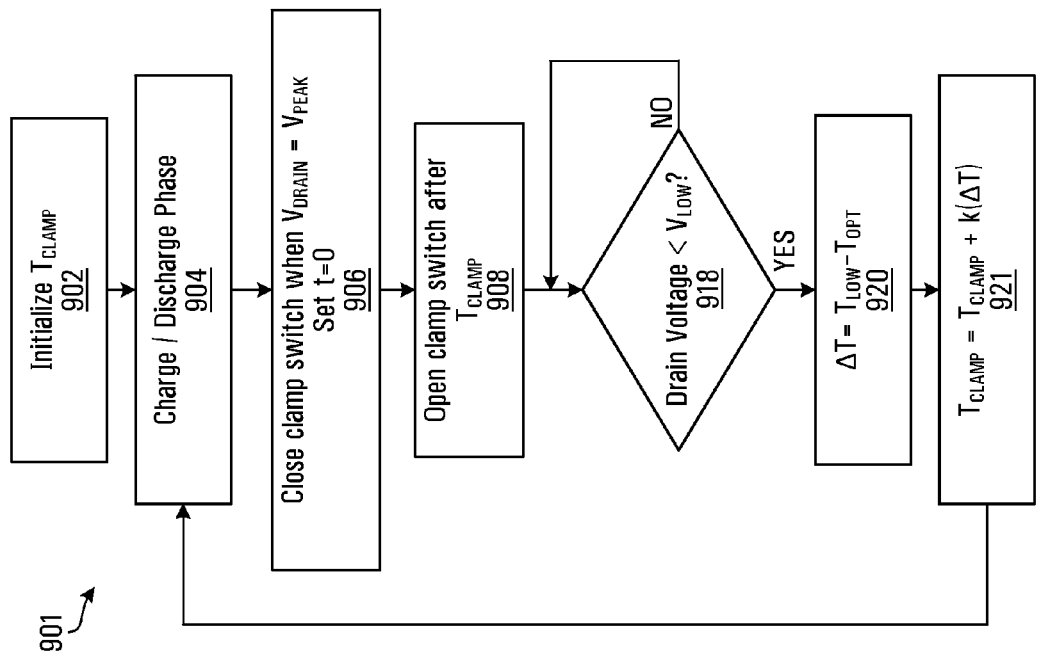
FIG. 9B is a flowchart of an example clamp ON time control loop using a single pair of voltage and time values to calculate a voltage minimum.
Figure 9A:
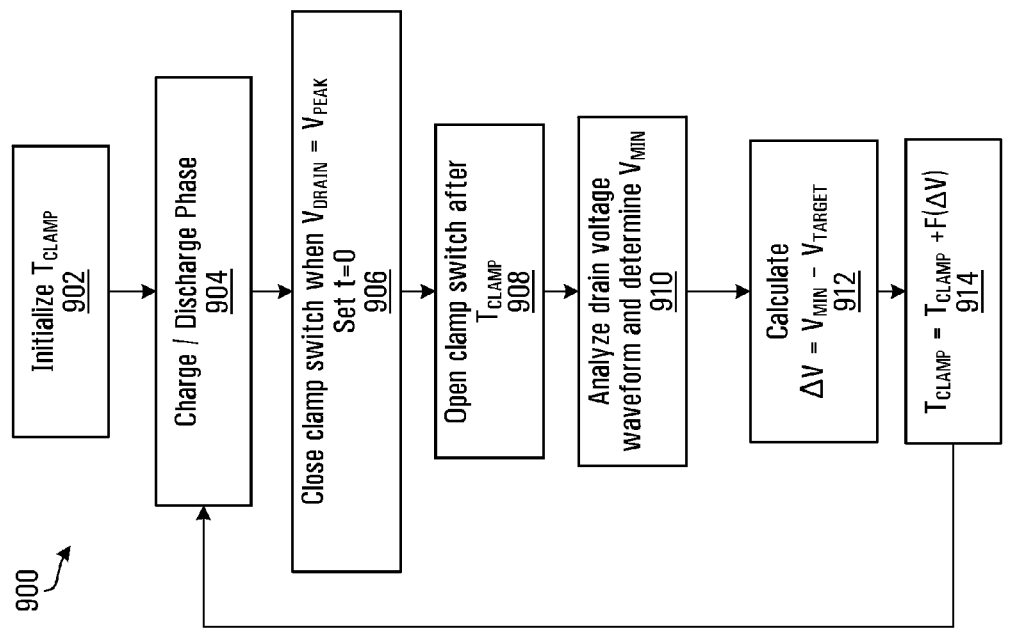
FIG. 9A is a flowchart of an example clamp ON time control loop.

In one embodiment the amount of time that clamp switch 328 is closed (its "ON time") is self-regulating using a control loop. FIG. 9A is a flowchart of an example clamp ON time control loop.

In the example method 900, the clamp switch ON time $T_{CLAMP}$ is initialized to a starting value at 902. A suitable starting value could be determined, for example from simulated or actual waveforms or measurements during the design of the converter. At 904 the charge phase of the converter is executed, comprising the previously described steps of closing the converter switch, illustratively a primary switch 304 in the example converter 300 or a switch 704 in a non-transformer embodiment, and charging the storage inductance, and then the converter switch is opened to begin the discharge phase. As previously described, the clamp switch is closed at 906 to coincide with a local maximum in the drain resonance voltage. A timer "t" is initialized to zero. When the timer reaches the value of $T_{CLAMP}$ the clamp switch is opened at 908. The shape of the drain node voltage waveform until the converter switch turns ON again is analyzed at 910. The analysis at 910 determines a value of the drain voltage minimum ($V_{MIN}$). A voltage difference ($\Delta V$) between the value of the voltage minimum ($V_{MIN}$) and a target minimum value ($V_{TARGET}$) is determined at 912. At 914, $T_{CLAMP}$ is adjusted by an amount that is a function F of the voltage difference F($\Delta$V) and is zero if $V_{MIN}=V_{TARGET}$. In an embodiment, "F" is a linear function of the form $$F = a\Delta V$$

where "a" is a constant,
and the size of any increase or decrease to $T_{CLAMP}$ is proportional to $\Delta V$. If $\Delta V$ is a positive value then $T_{CLAMP}$ will increase, if $\Delta V$ is a negative value $T_{CLAMP}$ will decrease, and if $V_{MIN}=V_{TARGET}$ then $T_{CLAMP}$ will not change. The possibly revised value of $T_{CLAMP}$ is then used on the next cycle of the converter.

In some embodiments $V_{TARGET}$ is zero. In other embodiments it may be preferable to set $V_{TARGET}$ slightly above zero. For example, in the forward boost converter 600 of FIG. 6, under high power the drain voltage cannot be resonated to zero due to the reflected voltage of resonant capacitance 616. In this case a $V_{TARGET}$ above zero is preferable.

The voltage minimum may be measured in a variety of ways. For example, an analog to digital converter might be employed, in the controller 335 for example, to digitize the drain voltage waveform at multiple points and the voltage minimum determined from those values. In the case where the voltage minimum is less than zero it cannot be measured directly due to the clamping action of diode 330 described above. In this circumstance the minimum could be estimated rather than directly measured.

Alternately, a small number of measurement points could be employed to estimate the voltage minimum. FIG. 9B is a flowchart of an example clamp ON time control loop using a single pair of voltage and time values to calculate a voltage minimum.

In the method 901, the clamp ON time is initialized to a starting value at 902. This starting value could be the same start value as in the example method 900. At 904 the charge phase of the converter is executed comprising the previously described steps of closing the converter switch, charging the storage inductance and then opening the switch to begin the discharge phase. The clamp switch is closed and a timer "t" is initialized to zero at 906. When the timer reaches the value of $T_{CLAMP}$ the clamp switch is opened at 908.

At 918 a determination is made, using a comparator, for example, as to whether the drain voltage has decreased to a preset value $V_{LOW}$. In one embodiment $V_{LOW}$ is set to a value slightly above zero.

The time interval $T_{LOW}$ between the opening of the clamp switch and the drain voltage reaching $V_{LOW}$ is determined, and can be used as a proxy or estimate of the drain voltage minimum. A time difference ($\Delta T$) between $T_{LOW}$ and its optimal value ($T_{OPT}$) which corresponds to a voltage minimum of zero, is determined at 920. $T_{CLAMP}$ is adjusted by an amount k($\Delta T$) at 921, where "k" is a constant. At 921, if $T_{LOW}$ is less than $T_{OPT}$ then $T_{CLAMP}$ is decreased, if $T_{LOW}$ is greater than the optimal value $T_{OPT}$ then $T_{CLAMP}$ is increased, and if $T_{LOW}=T_{OPT}$ then $T_{CLAMP}$ will not change. The possibly revised value of $T_{CLAMP}$ is then used on the next switching cycle of the converter. The k($\Delta T$) term at 921 is an example of a linear or proportional adjustment function. More generally, an adjustment at 921 could be expressed as a function F of ($\Delta T$), or F($\Delta T$).

It should be appreciated that "F" is used herein to denote a generic "function" rather than an indication of any specific function. The linear function F($\Delta V$) described above with reference to FIG. 9A is intended as an illustrative example. Another example linear function k($\Delta T$) is shown at 921 in FIG. 9B. The constants "a" above and "k" in FIG. 9B could have the same value or different values. Similarly, the function F($\Delta V$) and F($\Delta T$) could, but need not necessarily, be the same function or type of function.

Drain Node Discharge Control at Zeroth Maximum

The above control methods are suitable for controlling the clamp ON time at all resonance maxima beyond the zeroth maximum. The zeroth maximum represents the point at which the storage inductance has just finished discharging and the converter begins quasi-resonance. The position of the zeroth maximum may be difficult to locate since the sinusoid has not yet begun and there is no available zero crossing measurement.

Figure 10:
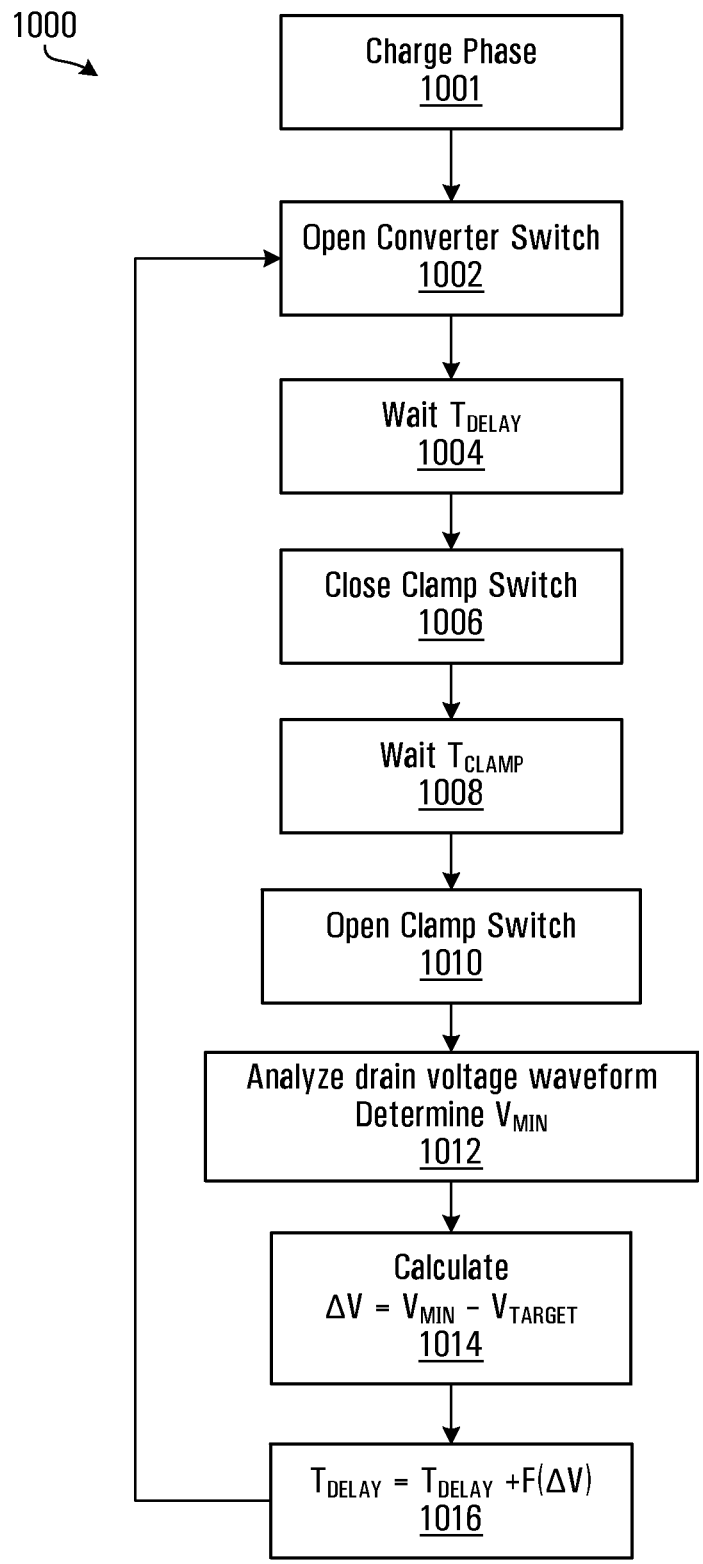
FIG. 10 is a flowchart of an example clamp ON time control loop suitable for operating at the zeroth maximum.

FIG. 10 is a flowchart of an example clamp ON time control loop suitable for operating at the zeroth maximum. In the method 1000, at 1001 the charge phase of the converter is executed comprising the previously described steps of closing the converter switch and charging the storage inductance. The converter switch is opened at 1002 to begin the discharge phase. After waiting for a time $T_{DELAY}$ at 1004, the clamp switch is closed at 1006. $T_{DELAY}$ is chosen such that the clamp switch closes before the beginning of the zeroth maximum. The switching loss in the clamp switch is minimal since the drain voltage is at its maximum value, just as in the case when the clamp switches at a resonant maximum. After a delay of $T_{CLAMP}$ at 1008 the clamp switch is opened at 1010. $T_{CLAMP}$ is the ON time of the clamp switch and is chosen such that the clamp switch opens after the beginning of quasi-resonance. The drain voltage waveform until the primary switch turns ON again is analyzed at 1012, and a value of the drain voltage minimum ($V_{MIN}$) is determined. A voltage difference ($\Delta V$) between the value of the voltage minimum and a target value ($V_{TARGET}$) is determined at 1014. At 1016 $T_{CLAMP}$ is adjusted by an amount that is a function F of the voltage difference F($\Delta V$) and is zero if $V_{MIN}=V_{TARGET}$. In an embodiment, "F" is a linear function of the form $$F = a\Delta V$$

where "a" is a constant,
and the size of any increase or decrease to $T_{DELAY}$ is proportional to $\Delta V$. If $\Delta V$ is a positive value then $T_{DELAY}$ will increase, if $\Delta V$ is a negative value $T_{DELAY}$ will decrease, and if $V_{MIN}=V_{TARGET}$ then $T_{DELAY}$ will not change. The possibly revised value of $T_{DELAY}$ is then used on the next cycle of the converter. As noted above, F and a are intended to be generic, and F($\Delta V$) in FIG. 10 need not be the same function or type of function as F($\Delta V$) in FIG. 9A and/or F($\Delta T$) in FIG. 9B.

Figure 11:
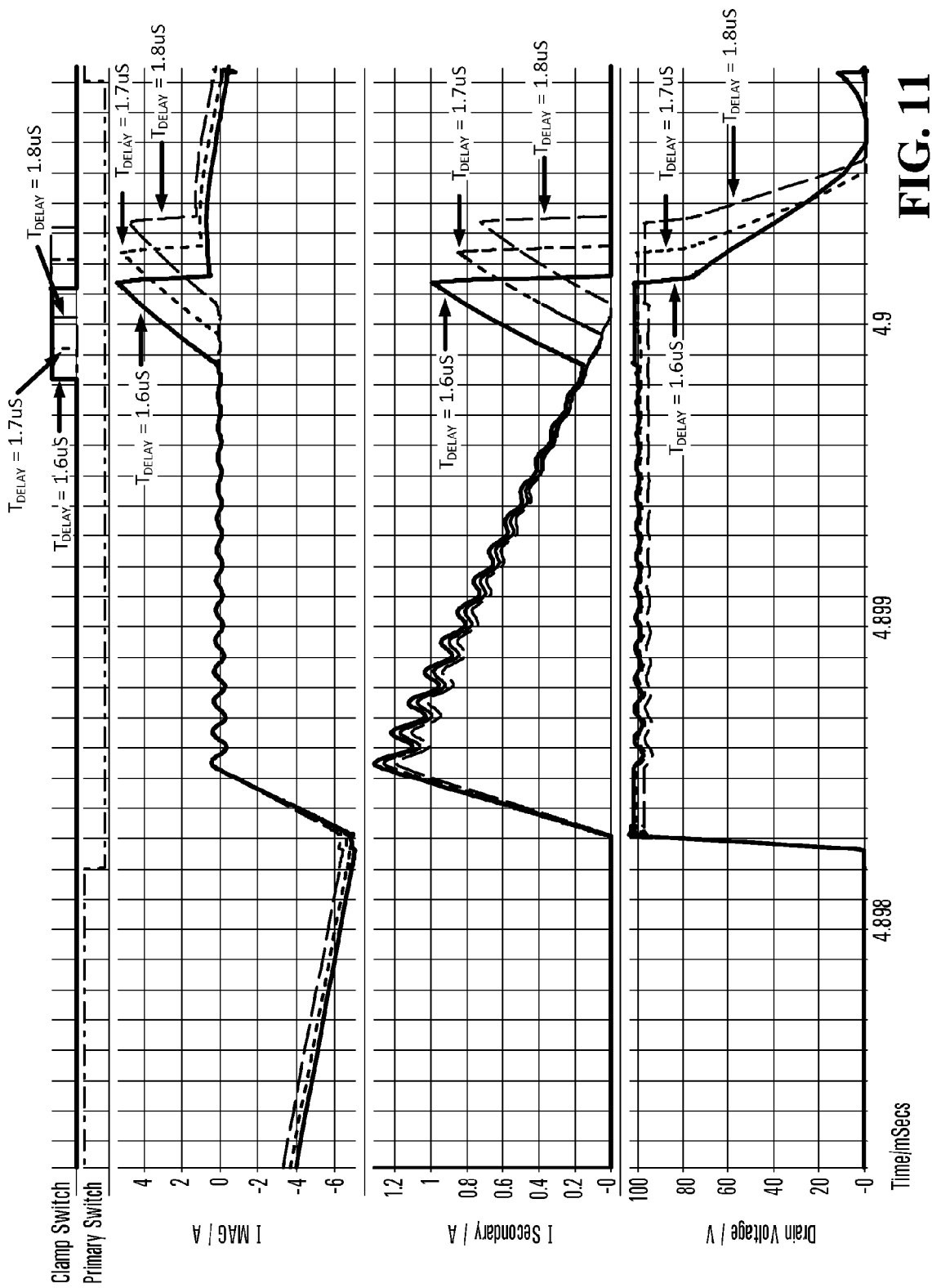
FIG. 11 shows simulation plots of drain voltage, secondary current and magnetisation current versus time of an example active clamp flyback converter for three different values of $T_{DELAY}$.

FIG. 11 shows simulation plots of drain voltage, secondary current and magnetisation current versus time of an example active clamp flyback converter for three different values of $T_{DELAY}$. The simulation was done using a commercially available simulation package. The values of magnetisation inductance 314, leakage inductance 350, primary switch capacitance 332, clamp capacitance 326, output capacitance 324, and load 305 (FIG. 3A) were 14 uH, 70 nH, 2.3 nF, 4.7 nF, 10 uF and 1.15 Kohms respectively. The turns ratio of transformer 302 was 5. The voltage $V_{IN}$ of the input supply 301 was 45 V. The flyback cycle was 4.8 uS, the primary switch ON time was 2.2 uS and the clamp switch ON time was 0.3 uS. Values of $T_{DELAY}$ used were 1.6 uS, 1.7 uS and 1.8 uS. From inspection of FIG. 11 it is clear that the slope of the decrease in drain voltage after clamp switch 328 opens is steepest for a delay of 1.8 nS and is shallowest for a delay of 1.6 uS.

For the purposes of discharging the drain voltage, shortening $T_{DELAY}$ has the effect of shortening the effective ON time of the active clamp because the clamp capacitance 326 is only coupled to magnetisation inductance 314 for the period between the discharge of magnetisation inductance 314 and the opening of clamp switch 328. The magnetisation inductance 314 therefore has less stored energy to resonate the drain voltage down with after clamp switch 328 is opened.

Drain Node Discharge Energy Control

Figure 12:
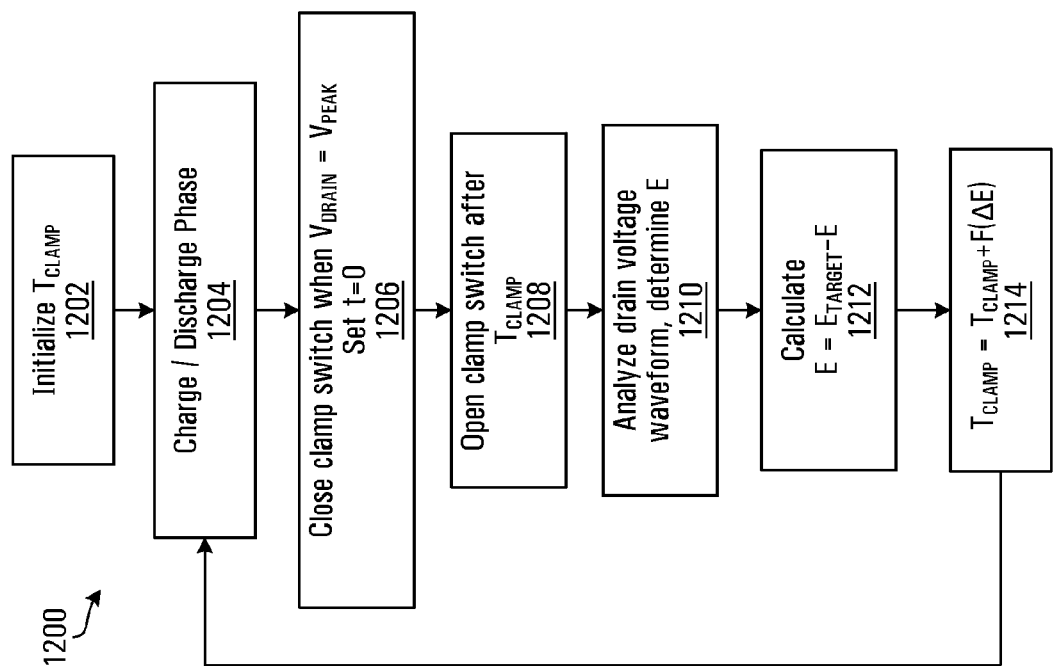
FIG. 12 is a flowchart of another example clamp ON time control loop.

FIG. 12 is a flowchart of another example clamp ON time control loop. In this method 1200 the discharge of the drain node is still controlled by varying the ON time of the clamp switch, however the control variable is the energy stored in the storage inductance. The target energy $E_{TARGET}$ is the amount of energy stored on the parasitic capacitance of the converter switch and is given by the formula:

$$E_{TARGET} = C_{PARA} \times \frac{V_{DRAIN}}{2}$$

As in FIG. 9A, the clamp switch ON time $T_{CLAMP}$ is initialized to a starting value at 1202. At 1204 the charge phase of the converter is executed, comprising the previously described steps of closing the converter switch and charging the storage inductance and then the converter switch is opened to begin the discharge phase. The clamp switch is closed at 1206 when the drain voltage $V_{DRAIN}$ is at a voltage maxima $V_{PEAK}$ in the drain resonance voltage. A timer "t" is initialized to zero. When the timer reaches the value of $T_{CLAMP}$ the clamp switch is opened at 1208. The shape of the drain node voltage waveform until the converter switch turns ON again is analyzed at 1210. In this method 1200, the drain waveform is analyzed at 1210 to determine the energy (E) stored in the storage inductance during the clamp ON time. An energy difference (ΔE) between the value of the stored energy and a target energy value ($E_{TARGET}$) is determined at 1212. At 1214 $T_{CLAMP}$ is adjusted by an amount F(ΔE) that is a function F of the energy difference and is zero if $E=E_{TARGET}$. In an embodiment, "F" is a linear function of the form $$F=a\Delta E$$

where "a" is a constant,
and the size of any increase or decrease to $T_{CLAMP}$ is proportional to ΔE. If ΔE is a positive value then $T_{CLAMP}$ will increase, if ΔE is a negative value $T_{CLAMP}$ will decrease, and if $E=E_{TARGET}$ then $T_{CLAMP}$ will not change. The possibly revised value of $T_{CLAMP}$ is then used on the next cycle of the converter. Again, as noted above, F and a are intended to be generic, and F(ΔE) in FIG. 12 need not be the same function or type of function as F(ΔV) in FIG. 9A, and/or F(ΔT) in FIG. 9B, and/or F(ΔV) in FIG. 10.

Alternate Clamp Topologies

Active clamping as disclosed herein is not restricted to the clamp topology of the preceding embodiments. FIG. 13A is a schematic diagram of an alternate example active clamp circuit topology in a generic converter. As in previous embodiments, active clamp circuit 800 comprises clamp capacitance 826, clamp switch 828 and clamp diode 829. Unlike in the clamp topology of the previous embodiments however, clamp capacitance 826 connects to the negative terminal of input supply 801 rather than the positive terminal. For completeness, storage inductance 802, converter switch 804, and node 833 are also shown in FIG. 13A.

Figure 13B:
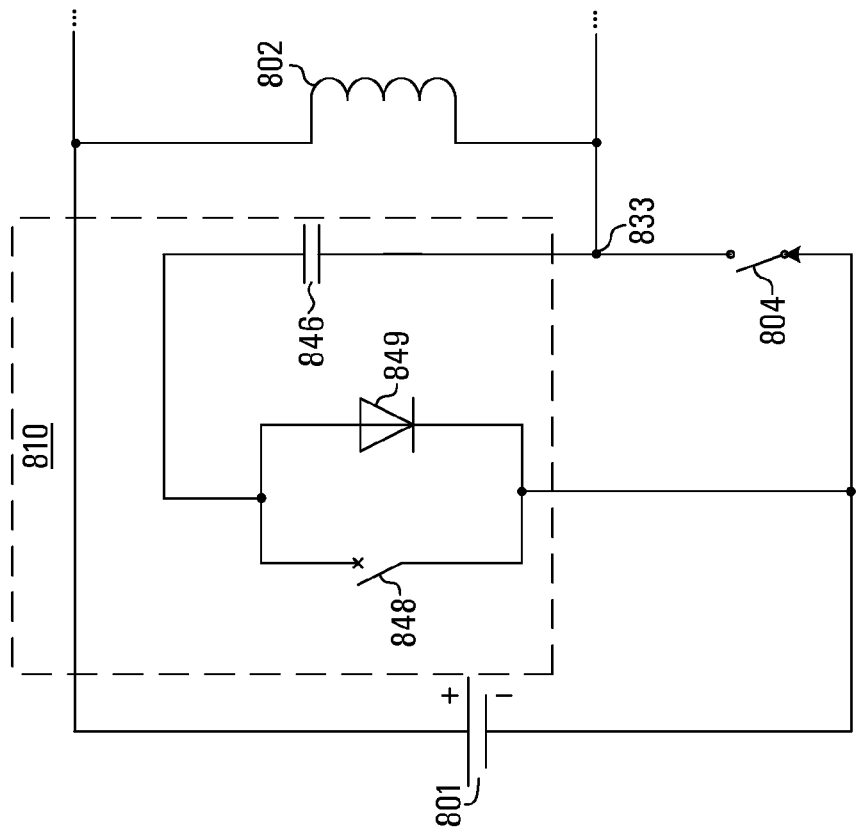
FIG. 13B is a schematic diagram of another example active clamp circuit topology used in a generic converter.
Figure 13A:
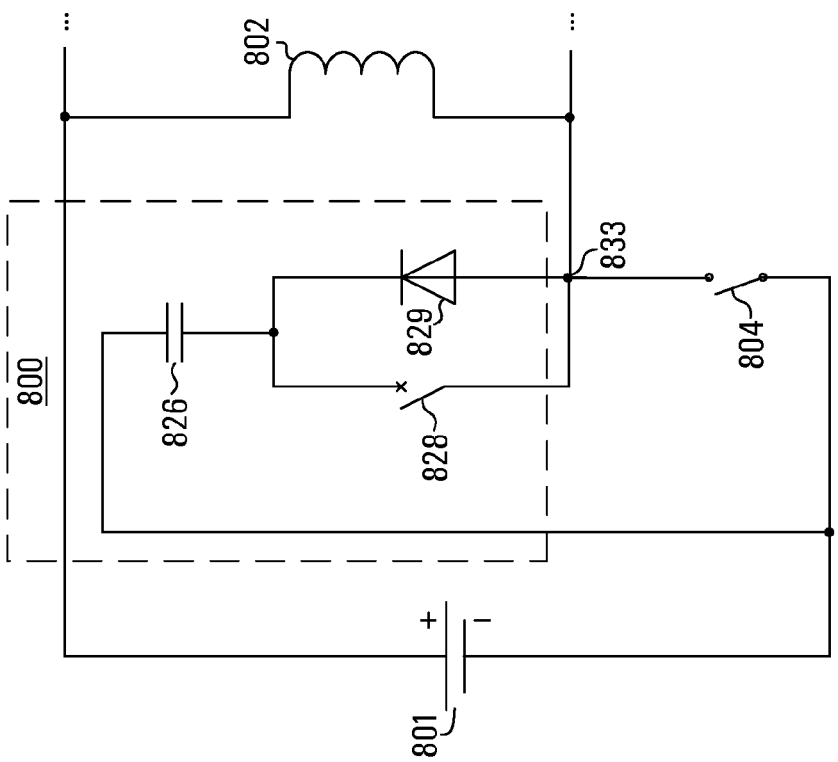
FIG. 13A is a schematic diagram of an alternate example active clamp circuit topology in a generic converter.

FIG. 13B is a schematic diagram of another example active clamp circuit topology used in a generic converter. In this embodiment, clamp switch 848 and diode 849 of the active clamp circuit 810 are coupled to the negative terminal of supply 801 rather than drain node 833 as in the previous embodiments. In one embodiment of this active clamp circuit, clamp switch 846 is a PMOS power MOSFET and diode 849 is the intrinsic diode formed between the source and body of the MOSFET.

Figure 13C:
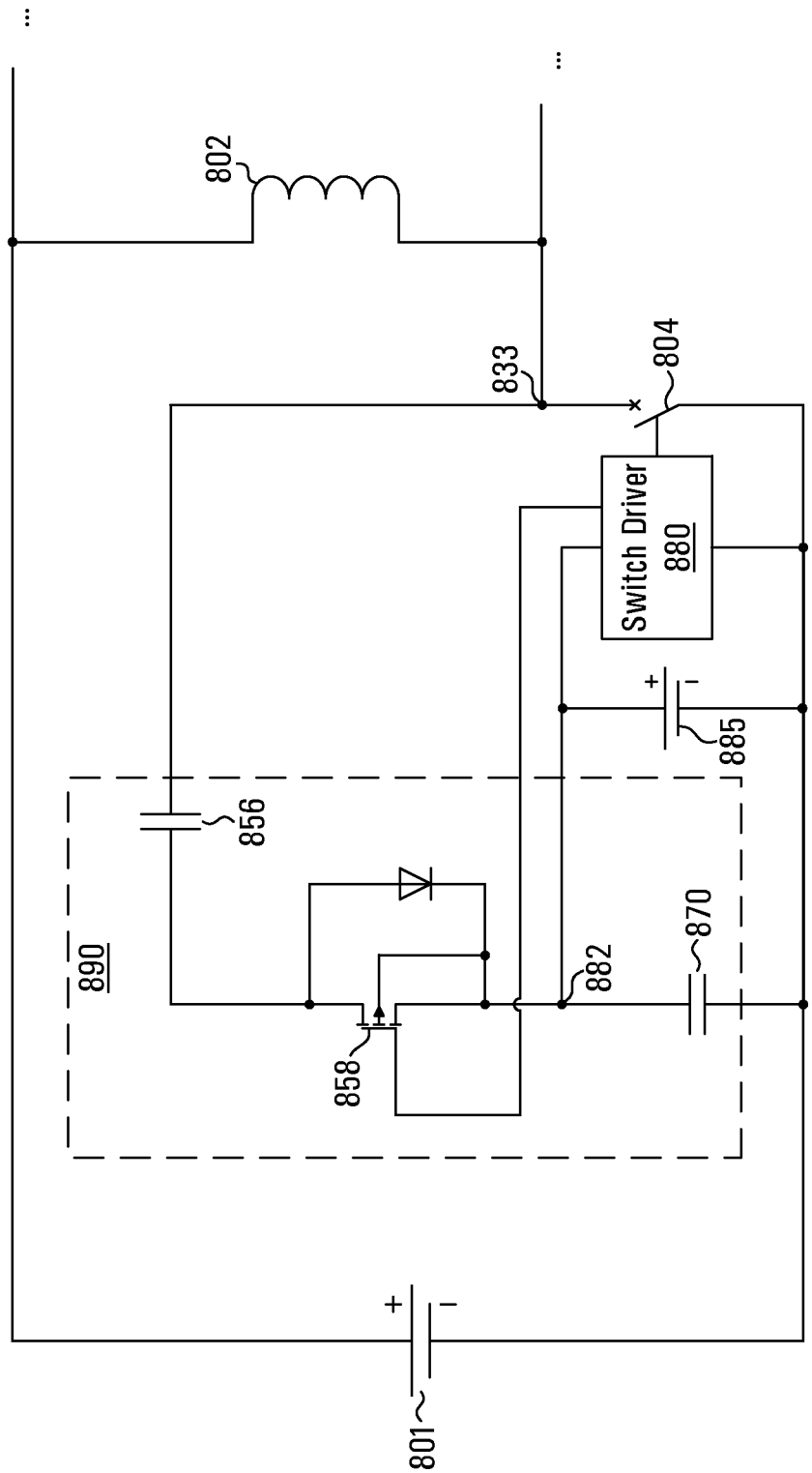
FIG. 13C is a schematic diagram of another example active clamp circuit.

FIG. 13C is a schematic diagram of another example active clamp circuit. Active clamp circuit 890 includes clamp capacitance 856 and clamp transistor 858. Clamp transistor 858 is a PMOS power MOSFET and incorporates the clamp's switching and diode functions. The diode is the intrinsic source to body diode of the MOSFET. Switch driver 880, which is a portion of a controller or control means, provides the necessary drive signals for converter switch 804 and clamp MOSFET 858. The voltage supply 885 for switch driver 880 is connected to supply node 882. In this topology, the drain of transistor 858 is coupled to supply node 882 instead of to the negative terminal of input supply 801. This arrangement allows PMOS 858 to be used without having to supply a negative voltage (a voltage below the voltage of the negative terminal of supply 801). This simplifies the design of switch driver 880. Capacitor 870 is a decoupling capacitor to reduce transient voltages on node 882.

Figure 14:
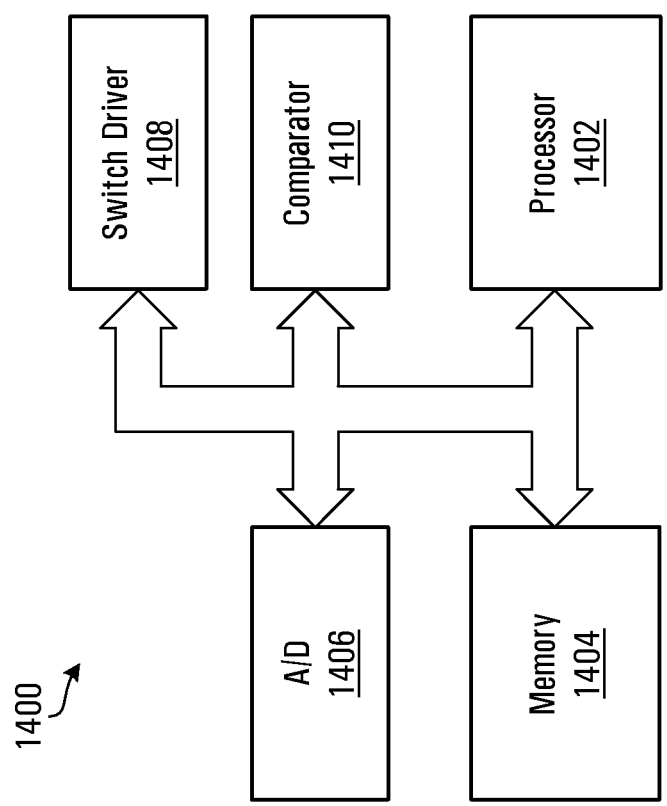
FIG. 14 is a block diagram of an example controller.

FIG. 14 is a block diagram of an example controller. Controller 1400 contains processor 1402, memory 1404, analog to digital converter 1406, comparator 1410 and switch driver 1408. Memory 1404 stores data and instructions for processing by processor 1402. Memory 1402 may contain volatile memory, such as Static Random Access Memory (SRAM) and/or Dynamic Random Access Memory (DRAM), and may also or instead include non-volatile memory such as Read Only Memory (ROM) or flash memory. Processor 1402 executes control algorithms such as those described in FIGS. 9A, 9B, 10 and 12 in the example shown. Switch driver 1408 generates signals to control the opening and closing of the clamp and converter switches. Analog to digital converter 1406 obtains drain voltage measurements of, for example nodes 333, 633, 733, 833 and converts the measurements to digital data for processing. Comparator 1410 can be used to detect zero crossings of the drain voltage and crossing of the drain voltage above or below preset threshold values, such as at 918 in FIG. 9B, for example.

The example controller 1400 is intended solely for illustrative purposes. Other embodiments could include further, fewer, and/or different components interconnected in a similar or different order.

According to various embodiments disclosed herein, an apparatus 300, 600, 700 may include an active clamp circuit, which includes a clamp capacitance 326, 626, 726, 826, 846, 856, a diode 329, 629, 729, 829, 849, 858 (intrinsic in MOSFET 858), and a clamp switch 328, 628, 728, 828, 848, 858. The clamp capacitance and the clamp switch are coupled in a circuit path, and the diode is coupled across the clamp switch. A power converter is coupled to the active clamp circuit, and includes a storage inductance 314, 614, 702, 802 coupled in a circuit path with a converter switch. The converter switch could be a primary switch 304, 604 in transformer embodiments, or a switch such as shown at 704, 804 in non-transformer embodiments.

A controller 335, 635, 735 is operatively coupled to the clamp switch and the converter switch, to close the clamp switch during a non-conduction phase of the converter switch in a converter switching cycle to cause the clamp capacitance to be discharged into the storage inductance exclusively through the clamp switch, and to subsequently open the clamp switch during the non-conduction phase of the converter switch to cause the clamp capacitance to be charged from the storage inductance exclusively through the diode during a non-conduction phase of the converter switch in a next converter switching cycle.

The references herein to discharging the clamp capacitance "exclusively" through the clamp switch and charging the clamp capacitance "exclusively" through the diode are intended to convey the notion of exclusivity between the clamp switch and the diode.

Other components could be involved in the charging and discharging. In embodiments disclosed herein, the clamp switch is closed and the diode in the active clamp circuit is reverse biased and non-conducting when the clamp capacitance is discharging, and during clamp capacitance charging the diode is forward biased and the clamp switch is open. For example, with reference to FIG. 3A, charging of the clamp capacitance 326 from the storage inductance 314 is exclusively through the diode 329 (that is, exclusive between the diode 329 and the clamp switch 328 which is open during clamp capacitance charging), but such charging is not exclusive of other converter components such as the leakage inductance 350, for instance.

The controller could be configured to open the clamp switch during the discharge of the clamp capacitance to reduce the voltage across the converter switch before it is closed at the beginning of the next switching cycle.

The circuit path of the power converter is coupled across terminals of an input power source, and the circuit path of the active clamp circuit is coupled between (i) a node in the circuit path of the power converter between the storage inductance and the converter switch and (ii) one of the terminals of the input power source. In FIGS. 3A, 6, and 7, the circuit path of the active clamp circuit is coupled to a positive terminal of the input power source, and FIGS. 13A to 13C show embodiments in which the circuit path of the active clamp circuit is coupled to a negative terminal of the input power source.

In the embodiment of FIG. 13C, the clamp switch is a PMOS power MOSFET 858, and the diode is an intrinsic diode formed between a source and a body of the PMOS power MOSFET. The circuit path of the active clamp circuit 890 is coupled to the node, and the active clamp circuit also includes a second capacitance 870 coupling the circuit path of the active clamp circuit to the negative terminal of the input power source 801. The controller in this embodiment would include the switch driver 880, and the voltage supply 885 coupled to supply the supply node 882 between the second capacitance 870 and the circuit path of the active clamp circuit 890 that includes the capacitance 856 and the PMOS power MOSFET 858.

Several examples of switching control techniques or control loops are described. For instance, the controller could be configured to determine timing of a voltage maximum at the node, and to close the clamp switch at the voltage maximum.

Operation in accordance with FIG. 9A could involve the controller closing the clamp switch at 906 during the non-conduction phase of the converter switch in the converter switching cycle, opening the clamp switch at 908 at an end of the clamp switch ON time $T_{CLAMP}$, analyzing at 910 a waveform of the voltage at the node until the converter switch is closed in the next converter switching cycle, and controlling a value of the clamp switch ON time for the next converter switching cycle at 912, 914 based on the analysis. At 910, the controller could analyze the waveform of the voltage at the node to determine a value of the node voltage minimum, and control the value of the clamp switch ON time based on the voltage difference $\Delta V$ between the determined value of the voltage minimum and a target minimum. The voltage difference $\Delta V$ is determined at 912, and an adjustment based on $\Delta V$, shown as $F(\Delta V)$ is applied to the clamp switch ON time $T_{CLAMP}$ at 914. In an embodiment, $F(\Delta V)$ is proportional to $\Delta V$ as described above, such that the value of the clamp switch ON time is decreased at 914 where the determined value of the voltage minimum is below the target minimum, increased where the determined value of the voltage minimum is above the target minimum, and maintained at its current value (that is, the adjustment is zero) where the determined value of the voltage minimum is equal to the target minimum.

For the control loop of FIG. 9B, the controller is configured to close the clamp switch at 906 for the clamp switch ON time $T_{CLAMP}$ during the non-conduction phase of the converter switch in the converter switching cycle, to open the clamp switch at 908 at an end of the clamp switch ON time $T_{CLAMP}$, to determine a time interval $T_{LOW}$ between the opening of the clamp switch and a time at which voltage at the node reaches a preset voltage, and to control the value of the clamp switch ON time for the next converter switching cycle at 921 based on a time difference $\Delta T$, determined at 920, between the determined time interval $T_{LOW}$ and a time interval value $T_{OPT}$ which corresponds to a voltage minimum of zero at the node. The value of the clamp switch ON time $T_{CLAMP}$ is adjusted at 921 by an amount proportional to $\Delta T$ in the example shown. $T_{CLAMP}$ decreased at 921 where the determined time interval $T_{LOW}$ is less than the time interval value $T_{OPT}$, and is increased at 921 where the determined time interval $T_{LOW}$ is greater than the time interval value $T_{OPT}$. The adjustment to $T_{CLAMP}$ at 921 is zero where $T_{LOW}=T_{OPT}$.

The zeroth maximum control loop of FIG. 10 could be implemented by configuring the controller to close the clamp switch at 1006 at a delay time after the converter switch is opened at 1002 in a converter switching cycle, to open the clamp switch at 1010 at an end of the clamp switch ON time during which the clamp switch remained closed, to analyze a waveform of the voltage at the node at 1012 until the converter switch is closed in the next converter switching cycle, and to control a value of the delay time for the next converter switching cycle at 1014, 1016 based on the analysis. In the embodiment shown in FIG. 10, the waveform is analyzed at 1012 to determine a value of a node voltage minimum, and the value of the delay time is controlled at 1016 based on a voltage difference $\Delta V$ determined at 1014, between the determined value of the node voltage minimum and a target value. In an embodiment where $F(\Delta V)$ is a linear function, $T_{CLAMP}$ is decreased at 1016 where the determined value of the node voltage minimum is less than a target value, increased at 1018 where the determined value of the node voltage minimum is above the target value, or maintained at its current value where the voltage difference is zero.

A control loop based on FIG. 12 could be implemented by configuring the controller to analyze the waveform of the voltage at the node at 1210 to determine energy stored in the storage inductance, and to control the value of the clamp switch ON time at 1214 based on an energy difference, determined at 1212, between the stored energy and a target energy. For a linear function $F(\Delta E)$ described above, the controller is configured to decrease the value of the clamp switch ON time at 1214 where the stored energy is greater than the target energy, to increase the value of the clamp switch ON time at 1214 where the stored energy is less than the target energy, and to maintain the current value of the clamp switch ON time at 1214 where the stored energy is equal to the target energy.

Method embodiments may provide similar features. In an embodiment, a method involves controlling a converter switch of a power converter to provide a conduction phase and a non-conduction phase during converter switching cycles. The power converter includes a storage inductance coupled in a circuit path with the converter switch. Such a method also involves controlling a clamp switch of an active clamp circuit. The active clamp circuit includes a clamp capacitance, a diode, and the clamp switch, with the clamp capacitance and the clamp switch being coupled in a circuit path, and the diode being coupled across the clamp switch. Control of the clamp switch includes closing the clamp switch during the non-conduction phase of the converter switch in a converter switching cycle to cause the clamp capacitance to be discharged into the storage inductance exclusively through the clamp switch, and subsequently opening the clamp switch during the non-conduction phase of the converter switch to cause the clamp capacitance to be charged from the storage inductance exclusively through the diode during the non-conduction phase of the converter switch in the next converter switching cycle.

FIGS. 9A, 9B, 10, and 12 illustrate control loops that could be provided in various method embodiments.

What has been described is merely illustrative of the application of principles of embodiments of the present disclosure. Other arrangements and methods can be implemented by those skilled in the art.

For example, the contents of the drawings are intended solely for the purposes of illustrating example embodiments. Other embodiments could include further, fewer, and/or different components or method operations, performed or interconnected in a similar or different order than shown.

In addition, although described primarily in the context of methods and systems, other implementations are also contemplated, as instructions stored on a non-transitory computer-readable medium, for example.

We claim:

1. An apparatus comprising:
   an active clamp circuit, the active clamp circuit comprising a clamp capacitance, a diode, and a clamp switch, the clamp capacitance and the clamp switch being coupled in a circuit path, and the diode being coupled across the clamp switch;
   a power converter coupled to the active clamp circuit, the power converter comprising a storage inductance coupled in a circuit path with a converter switch; and
   a controller, operatively coupled to the clamp switch and the converter switch, to close the clamp switch during a non-conduction phase of the converter switch in a converter switching cycle to cause the clamp capacitance to be discharged into the storage inductance exclusively through the clamp switch, and to subsequently open the clamp switch during the non-conduction phase of the converter switch to cause the clamp capacitance to be charged from the storage inductance exclusively through the diode during a non-conduction phase of the converter switch in a next converter switching cycle.

2. The apparatus of claim 1, wherein the controller is configured to open the clamp switch during the discharge of the clamp capacitance to reduce voltage across the converter switch.

3. The apparatus of claim 1, the circuit path of the power converter being coupled across terminals of an input power source, the circuit path of the active clamp circuit being coupled between (i) a node in the circuit path of the power converter between the storage inductance and the converter switch and (ii) one of the terminals of the input power source.

4. The apparatus of claim 3, the controller being configured to determine timing of a voltage maximum at the node, and to close the clamp switch at the voltage maximum.

5. The apparatus of claim 3, the controller being configured to close the clamp switch for a clamp switch ON time during the non-conduction phase of the converter switch in the converter switching cycle, to open the clamp switch at an end of the clamp switch ON time, to analyze a waveform of the voltage at the node until the converter switch is closed in the next converter switching cycle, and to control a value of the clamp switch ON time for the next converter switching cycle based on the analysis.

6. The apparatus of claim 5, the controller being configured to analyze the waveform of the voltage at the node to determine a value of the node voltage minimum, and to control the value of the clamp switch ON time based on a voltage difference between the determined value of the voltage minimum and a target minimum.

7. The apparatus of claim 5, the controller being configured to analyze the waveform of the voltage at the node to determine energy stored in the storage inductance, and to control the value of the clamp switch ON time based on an energy difference between the stored energy and a target energy.

8. The apparatus of claim 3, the controller being configured to close the clamp switch for a clamp switch ON time during the non-conduction phase of the converter switch in the converter switching cycle, to open the clamp switch at an end of the clamp switch ON time, to determine a time interval between the opening of the clamp switch and a time at which voltage at the node reaches a preset voltage, and to control a value of the clamp switch ON time for the next converter switching cycle based on a time difference between the determined time interval and a time interval value which corresponds to a voltage minimum of zero at the node.

9. The apparatus of claim 3, the controller being configured to close the clamp switch at a delay time after the converter switch is opened in the converter switching cycle, to open the clamp switch at an end of the clamp switch ON time during which the clamp switch is closed, to analyze a waveform of the voltage at the node until the converter switch is closed in the next converter switching cycle, and to control a value of the delay time for the next converter switching cycle based on the analysis.

10. The apparatus of claim 9, the controller being configured to analyze the waveform of the voltage at the node to determine a value of a node voltage minimum, and to control the value of the delay time based on a voltage difference between the determined value of the node voltage minimum and a target value.

11. The apparatus of claim 3,
    the clamp switch comprising a PMOS power Metal Oxide Semiconductor Field Effect Transistor (MOSFET), the diode comprising an intrinsic diode formed between a source and a body of the PMOS power MOSFET,
    the circuit path of the active clamp circuit being coupled to the node,
    the active clamp circuit further comprising a second capacitance coupling the circuit path of the active clamp circuit to the one of the terminals of the input power source,
    the controller comprising a voltage supply to supply a node between the second capacitance and the circuit path of the active clamp circuit.

12. A method comprising:
    controlling a converter switch of a power converter to provide a conduction phase and a non-conduction phase during converter switching cycles, the power converter comprising a storage inductance coupled in a circuit path with the converter switch;
    controlling a clamp switch of an active clamp circuit, the active clamp circuit comprising a clamp capacitance, a diode, and the clamp switch, the clamp capacitance and the clamp switch being coupled in a circuit path, and the diode being coupled across the clamp switch, controlling the clamp switch comprising closing the clamp switch during the non-conduction phase of the converter switch in a converter switching cycle to cause the clamp capacitance to be discharged into the storage inductance exclusively through the clamp switch, and subsequently opening the clamp switch during the non-conduction phase of the converter switch to cause the clamp capacitance to be charged from the storage inductance exclusively through the diode during the non-conduction phase of the converter switch in next converter switching cycle.

13. The method of claim 12, further comprising:
opening the clamp switch during the discharge of the clamp capacitance to reduce voltage across the converter switch.

14. The method of claim 12, the circuit path of the power converter being coupled across terminals of an input power source, the circuit path of the active clamp circuit being coupled between (i) a node in the circuit path of the power converter between the storage inductance and the converter switch and (ii) one of the terminals of the input power source, the method further comprising:
determining timing of a voltage maximum at the node,
closing the clamp switch comprising closing the clamp switch at the voltage maximum.

15. The method of claim 12, the circuit path of the power converter being coupled across terminals of an input power source, the circuit path of the active clamp circuit being coupled between (i) a node in the circuit path of the power converter between the storage inductance and the converter switch and (ii) one of the terminals of the input power source,
closing the clamp switch comprising closing the clamp switch for a clamp switch ON time during the non-conduction phase of the converter switch in the converter switching cycle,
opening the clamp switch comprising opening the clamp switch at an end of the clamp switch ON time,
the method further comprising:
analyzing a waveform of the voltage at the node until the converter switch is closed in the next converter switching cycle; and
controlling a value of the clamp switch ON time for the next converter switching cycle based on the analysis.

16. The method of claim 15, the analyzing comprising determining a value of the node voltage minimum; controlling a value of the clamp switch ON time comprising controlling the value of the clamp switch ON time based on a voltage difference between the determined value of the voltage minimum and a target minimum.

17. The method of claim 15 the analyzing comprising determining energy stored in the storage inductance; controlling a value of the clamp switch ON time comprising controlling the value of the clamp switch ON time based on an energy difference between the stored energy and a target energy.

18. The method of claim 12, the circuit path of the power converter being coupled across terminals of an input power source, the circuit path of the active clamp circuit being coupled between (i) a node in the circuit path of the power converter between the storage inductance and the converter switch and (ii) one of the terminals of the input power source,
closing the clamp switch comprising closing the clamp switch for a clamp switch ON time during the non-conduction phase of the converter switch in the converter switching cycle,
opening the clamp switch comprising opening the clamp switch at an end of the clamp switch ON time,
the method further comprising:
determining a time interval between the opening of the clamp switch and a time at which voltage at the node reaches a preset voltage;
controlling a value of the clamp switch ON time for the next converter switching cycle based on a time difference between the determined time interval and a time interval value which corresponds to a voltage minimum of zero at the node.

19. The method of claim 12, the circuit path of the power converter being coupled across terminals of an input power source, the circuit path of the active clamp circuit being coupled between (i) a node in the circuit path of the power converter between the storage inductance and the converter switch and (ii) one of the terminals of the input power source,
closing the clamp switch comprising closing the clamp switch at a delay time after the converter switch is opened in the converter switching cycle,
opening the clamp switch comprising opening the clamp switch at and end of a clamp switch ON time during which the clamp switch is closed,
the method further comprising:
analyzing a waveform of the voltage at the node until the converter switch is closed in the next converter switching cycle; and
controlling a value of the delay time for the next converter switching cycle based on the analysis.

20. The method of claim 19, the analyzing comprising determining a value of the node voltage minimum; controlling a value of the delay time comprising controlling the value of the delay time based on a voltage difference between the determined value of the node voltage minimum and a target value.

21. A non-transitory machine-readable medium storing instructions which, when executed, perform the method of claim 12.

* * * * *

UNITED STATES PATENT AND TRADEMARK OFFICE
CERTIFICATE OF CORRECTION

| | |
|---|---|
| PATENT NO. | : 9,077,254 B2 |
| APPLICATION NO. | : 13/940774 |
| DATED | : July 7, 2015 |
| INVENTOR(S) | : Raymond Kenneth Orr, Gabriel Scarlatescu and Tudor Lipan |

It is certified that error appears in the above-identified patent and that said Letters Patent is hereby corrected as shown below:

IN THE CLAIMS:

In Column 24, line 34, in Claim 19, delete "and" and insert --an--.

Signed and Sealed this
Twenty-first Day of June, 2016

Michelle K. Lee
*Director of the United States Patent and Trademark Office*